United States Patent [19]
Yamanaka

[11] Patent Number: 6,094,242
[45] Date of Patent: Jul. 25, 2000

[54] OPTICAL DEVICE AND HEAD-MOUNTED DISPLAY USING SAID OPTICAL DEVICE

[75] Inventor: Atsushi Yamanaka, Chiba, Japan

[73] Assignee: Sharp Kabushiki Kaisha, Osaka, Japan

[21] Appl. No.: 08/574,634

[22] Filed: Dec. 19, 1995

[30]     Foreign Application Priority Data

| Dec. 19, 1994 | [JP] | Japan | ................................. | 6-314842 |
| Mar. 31, 1995 | [JP] | Japan | ................................. | 7-075501 |
| Sep. 8, 1995  | [JP] | Japan | ................................. | 7-231368 |

[51] Int. Cl.⁷ .............................................. G02F 1/1335
[52] U.S. Cl. .............................. 349/13; 349/98; 349/115
[58] Field of Search ................................ 349/13, 98, 114, 349/115, 96

[56]             References Cited

U.S. PATENT DOCUMENTS

| 3,523,718 | 8/1970 | Crow ...................................... 359/484 |
| 4,073,571 | 2/1978 | Grinberg et al. ....................... 350/337 |
| 4,997,263 | 3/1991 | Cohen et al. ........................... 350/345 |
| 5,295,009 | 3/1994 | Barnik et al. .......................... 359/65 |
| 5,319,478 | 6/1994 | Funfschilling et al. .................. 359/53 |
| 5,325,218 | 6/1994 | Willett et al. . |
| 5,601,352 | 2/1997 | Okamura .................................. 353/31 |
| 5,659,420 | 8/1997 | Wakai et al. ........................... 359/368 |

FOREIGN PATENT DOCUMENTS

| 0302619   | 7/1988  | European Pat. Off. . |
| 0351967   | 6/1989  | European Pat. Off. . |
| A-0 348 141 | 12/1989 | European Pat. Off. . |
| A-0407830 A3 | 1/1991 | European Pat. Off. . |
| 0087998   | 2/1983  | France . |
| A-2656117 | 6/1991  | France . |
| A 2690534 | 10/1993 | France . |
| A 2693004 | 12/1993 | France . |
| 1 297351  | 6/1969  | Germany . |
| 60-117216 | 6/1985  | Japan . |
| 1-126620  | 5/1989  | Japan . |
| 1-133479  | 5/1989  | Japan . |
| 6-59217   | 3/1994  | Japan . |
| 2 240 402 | 3/1994  | United Kingdom . |
| WO9104508 | 4/1991  | WIPO . |

OTHER PUBLICATIONS

"Aberration–corrected catadioptric magnifiers useful for simple microfiche readers" Pramana, vol. 22, No. 3&4, Mar. & Apr. 1984, pp. 213–220.

"High Isolation Polarization–Insensitive Optical Circulator for Advanced Optical Communications Systems", by M. Koga et al., Journal of Lightwave Technology, vol. 10, No. 9, Sep. 1992, pp. 1210–1217.

"Polarization Splitting of Opposing Waves in the Ring Laser" by V. P. Vasil'ev et al., Journal of Applied Spectroscopy vol. 10, No. 4, Apr. 1969 pp. 619–621.

*Primary Examiner*—William L. Sikes
*Assistant Examiner*—Dung Nguyen
*Attorney, Agent, or Firm*—Birch, Stewart, Kolasch & Birch, LLP

[57]            ABSTRACT

The present invention provides a thin and light optical device for observing visual information with a large angle of visual field and a head-mount display (HMD) using the optical device. The optical device includes a refractor consisting of a refracting element with half-mirror coating and a circularly polarized light selecting semitransparent mirror, which are disposed in order from the incident side. The circularly polarized light selecting semitransparent mirror consists of a quarter-wave plate, a half-mirror and a polarizer or cholesteric liquid crystal, which are disposed in order from the incident side. A thin and high-magnification optical system is obtained by using the circularly polarized light selecting semitransparent mirror that first reflects incident light in a clockwise circularly polarized fashion and allows the counterclockwise circularly polarized light having made 1.5 round trips to pass therethrough without being reflected. A head-mount display (HMD) according to the present invention includes a liquid crystal display (LCD), a back light for the LCD and the above-mentioned optical device for magnifying an image of the LCD.

3 Claims, 20 Drawing Sheets

FIG.6
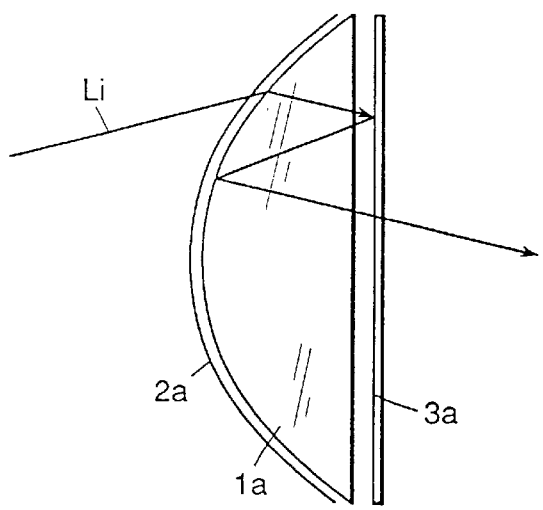
FIG. 7(A)    FIG. 7(B)
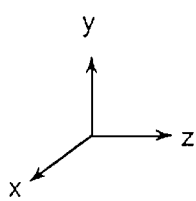 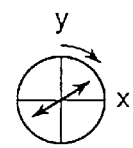
FIG. 7(C)
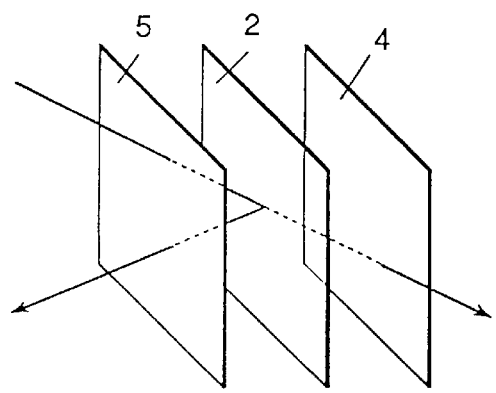

FIG.27
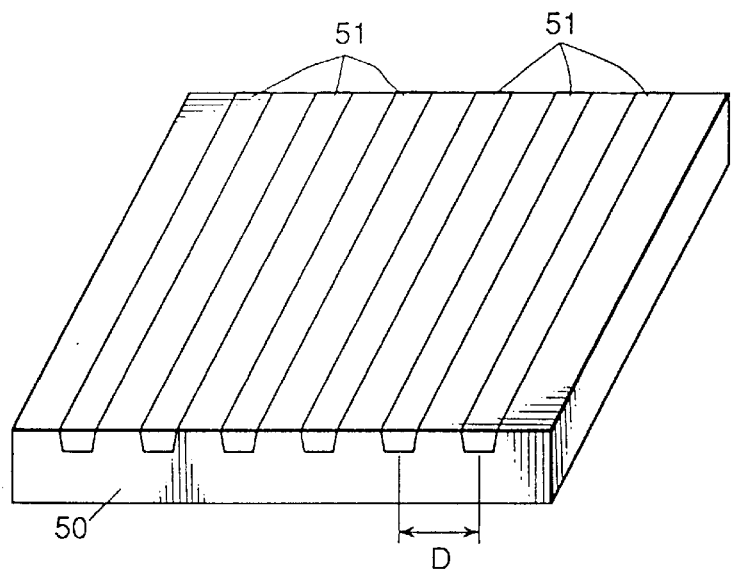
FIG. 28(A)
FIG. 28(B)
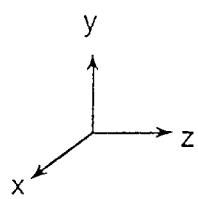 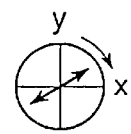
FIG. 28(C)
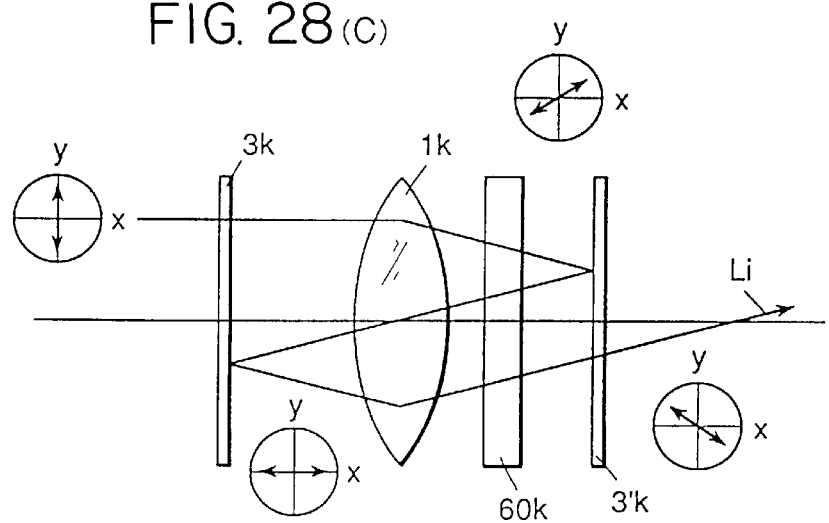

OPTICAL DEVICE AND HEAD-MOUNTED DISPLAY USING SAID OPTICAL DEVICE

BACKGROUND OF THE INVENTION

The present invention relates to an optical device for use in an image display device and, more particularly, to a small-sized light-weight optical device having a super-wide angle optical system and a head-mounted display provided with said optical device.

Recently, an increasing interest has been given to head-mounted display units as means for providing visual information in virtual reality and for realizing remote control of various kinds of robots. The essential requirements for such head-mounted display units are: they must have a wide-angle of visibility and high-resolution sufficient to provide visual information with reality and ambience and must be minimized in size and weight enough to be easily worn on a part of the body, particularly, on the head. The head-mounted display has a spectacle-like casing which is wearable on the head. The casing contains, in each of its lens-parts, a back-light, a liquid crystal panel (liquid crystal display) and a lens, which are arranged in the described order from the outside. The user can view an enlarged image on the liquid crystal panel in the said head-mounted display as though he looked at the image on a large screen.

With rapid progress in developing various liquid crystals in the past years, small-sized high-quality liquid crystal panels have been supplied for use in head-mounted display units. However, an optical device which is another main component of the head-mounted display has been insufficiently developed in respect to reducing its size and weight.

On the other hand, the head-mounted display units which have been used mainly hitherto in industrial applications and experimental applications of virtual reality, are now finding an increasing demand in home video-games and VTR display units. Accordingly, the saving in size and weight of head-mounted display units is further keenly required.

To solve the above-mentioned problems, conventional device has been proposed in the Japanese Laid-Open Patent Publication No. 6-59217. A head-mounted display has a liquid crystal display disposed at its top, wherefrom light L travels and is reflected backward by a semitransparent mirror, then is enlarged by a concave mirror and reflected back to the observer's eye. In the above case, the light is folded between the semitransparent mirror and the concave mirror, thereby the optical device used may have a saved size as compared with a linearly arranged device.

The prior art device with the liquid crystal panel arranged at the top, however, has the drawback that a reduction in size may be realized only with a reduced angle of visibility. Namely, to increase the angle of visibility for obtaining visual information with a high sense of immenseness, the semitransparent mirror having a larger size must be used in front of the liquid crystal panel, thereby the total thickness of the head-mounted display is increased and thus nullifies the size-saving effect of the optical device. In the above case, the angle of visibility from an observer is limited to not more than 90 degrees since the observer's eyes can not be advanced toward the concave mirror nearer than the semi-transparent mirror.

To solve the problem of saving in size and weight of a head-mounted display, a prior art device is disclosed in Japanese laying-open Patent Publication No. 1-133479. The head-mounted display has a liquid crystal display disposed at its top, wherefrom light L is deflected outwardly by a plane reflecting mirror, enlarged and reflected by a concave mirror and enters the eye. In this case, the light is folded between the plane reflecting mirror and the concave mirror, thereby the optical device used may have a saved size as compared with a linearly arranged device.

The prior art device with the liquid crystal panel arranged at the top, however, has the drawback that a reduction in size may be realized only with a reduced angle of visibility. Namely, to increase the angle of visibility for obtaining visual information with a high sense of immenseness, the semitransparent mirror having a larger size must be used in front of the liquid crystal panel, thereby the total thickness of the head-mounted display is increased and thus nullifies the size-saving effect of the optical device.

An optical device for use in a head-mounted display must be not only compact and light enough to be easily worn on the user's head but must have a wide angle of visibility and a short focal length to provide a vivid image to the observer. A Conventional device art intended to solve the above-mentioned problem is disclosed in the Japanese Laying-Open Patent Publication No. 1-126620 and Journal "VR news" vol. 3 issue Mar. 2, 1994. This device, however, is poor in its technical performance. A display displays an image from which light rays pass through a circularly polarizing filter and a concave mirror with a half-mirror coating and then are reflected by a cholesteric liquid crystal element. The reflected light rays are enlarged and reflected again by the concave mirror and fall onto the cholesteric liquid crystal element through which the rays are transmitted to eyes of the observer.

In the above device, the light path is folded between the cholesteric liquid crystal element and the half-mirror coated concave mirror, thereby the device may have a reduced size as compared with a device using an linearly arranged optical system.

The above-mentioned prior art involves three problems mentioned below:

The first problem is that an image may have a large curvature because the image is magnified only by the concave mirror. When an image formed on a planar screen of a display is viewed through an optical system having a large curvature, said image may be focused at its center portion but be out-of-focus at its peripheral portion. On the other hand, the optical system for the head-mounted display must have a high magnifying power and a super-wide angle of visibility to create an attractive image with an increased sense of reality. The above-mentioned optical system may increase the degree to which the image is out-of-focus if it is used in the prior art device. In other words, the prior art is unsuitable for realizing the required head-mounted display.

The second problem is the impossibility of realizing an optical system which has a large diameter and a short focal length. This is because increasing the diameter of the optical system increases the thickness of the concave mirror to the extent that the focus is included in the concave mirror. The head-mounted display has to sufficiently enlarge an image to fill the visual field. Therefore, the prior art can not be applied for this purpose.

The third problem is that the optical system of the prior art has a low transmission factor (25% in an ideal case) that makes the image dark. To overcome this drawback, it is needed to increase the luminance of the display four times or more, causing other disadvantages such as to increasing the size of the device and the electric power consumption.

SUMMARY OF THE INVENTION

The primary form of the present invention is to provide a small-sized (thin) light-weight optical device which has an optical system of a super-wide visual field and a short focal length to present wide-angle visual information, and to provide a head-mount display designed on the basis of said optical device, which is capable of presenting an attractive and realistic image to the user.

Another form of the present invention is to provide an optical device which comprises a reflecting-refracting element having a half-mirror coating layer and a semitransparent mirror for selecting circularly polarized light, which are arranged in the described order from the incident light side, and wherein the selecting semitransparent mirror selectively reflects or transmits incident light of a specified circular polarization and causes the light to travel twice or half the path between the reflecting-refracting element and the semitransparent mirror, respectively, thereby realizing increased optical power (magnification) of its refracting system and visual angle as well as a savings in size (thickness) and weight of the optical device.

Another form of the present invention is to provide an optical device characterized in that the semitransparent mirror for selecting circularly polarized light is composed of a quarter-wave plate, a half-mirror and a polarizer, which are disposed in the described order from the incident light side, thereby easily realizing an increased optical power (magnification) of its refracting system and visual angle as well as a savings in size (thickness) and weight of the optical device, since the quarter-wave plate, the half mirror and the polarizer are all manufactured to be sufficiently thin by existing technology.

Another form of the present invention is to provide an optical device, characterized in that the semitransparent mirror for selecting circularly polarized light is composed of a cholesteric liquid crystal display whereby the optical system may have an increased luminance.

Another form of the present invention is to provide an optical device, characterized in that a glass substrate in combination with the reflecting-refracting element is used for sandwiching the cholesteric liquid crystal therebetween to form an integral block, thereby making the optical device more compact.

Another form of the present invention is to provide an optical device which comprises a plano-convex lens having a half-mirror coated convex surface and a cholesteric liquid crystal adjacent to a plane surface of the plano-convex lens, said lens and said cholesteric liquid crystal being disposed in said order from the incident light side, thereby making the optical device more compact.

Another form of the present invention is to provide an optical device, characterized in that the cholesteric liquid crystal is a thin film of cholesteric liquid crystal formed on the surface of the plano-convex lens, thereby making the optical device more compact.

Another form of the present invention is to provide a head-mounted display, which comprises an image display device which is composed of a back light, a liquid crystal display, a quarter-wave plate and an optical device for magnifying an image of the liquid crystal display, thereby satisfying the essential requirements allowing mounting on the head of a user owing to employment of the thin compact light-weight optical device, having a widened visual angle as compared with the conventional head-mounted display and providing a high-quality image without curvature, which may attract an observer as if he is present therein.

Another form of the present invention is to provide an optical device, wherein a first polarizer, a first semitransparent mirror, a first quarter-wave plate, a second semitransparent mirror, a second quarter-wave plate, a second polarizer are successively arranged in the described order from the incident light side and a refracting element is further inserted between the first semitransparent mirror and the second semitransparent mirror, thereby increasing the optical power (magnifying factor) of the refracting element and a widened visual angle, and realizing at the same time savings in size (thickness) and weight.

Another form of the present invention is to provide an optical device, wherein a polarized light selecting semitransparent mirror, a semitransparent mirror, a first quarter-wave plate and a second quarter-wave plate are successively arranged in the described order from the incident light side and a refracting element is further inserted between the polarized light selecting semitransparent mirror and the semitransparent mirror to improve the ratio of signal light to noise light so that the (transmission efficiency) is improved.

Another form of the present invention is to provide an optical device, wherein a first polarized light selecting semitransparent mirror, a polarizing direction rotator and a second polarized light selecting semitransparent mirror are arranged successively in the described order from the incident light side and a refracting element is further inserted between the first polarized light selecting semitransparent mirror and the second polarized light selecting semitransparent mirror so that its transmission efficiency is much increased and no noise light is passed to the observer.

Another form of the present invention is to provide an optical device characterized in that either one or both of the two semitransparent mirrors, the two semitransparent mirrors for selecting polarized light or the semitransparent mirror and the semitransparent mirror for selecting polarized light, have curved surfaces, thereby realizing increased the optical power (magnification) of its refracting system and the visual angle as well as reduced in size (thickness) and weight of the optical device, increasing the transmission efficiency and completely eliminating the noise light.

Another form of the present invention is to provide an optical device, wherein a concave mirror having formed thereon a thin film of a cholesteric liquid crystal, a first quarter-wave plate, a Faraday element, a second quarter-wave plate and a cholesteric liquid crystal are arranged successively in the described order from the incident light side, thereby realizing an increased luminance of its optical system since the cholesteric liquid crystal may selectively reflect and transmit light rays with 100% efficiency.

Another form of the present invention is to provide an optical device, wherein a plano-convex mirror having a thin film of a cholesteric liquid crystal formed on its convex incident surface, a first quarter-wave plate adjacent to a plane surface of the plano-convex mirror, a Faraday element, a second quarter-wave plate and a cholesteric liquid crystal are arranged successively in the described order from the incident light side, thereby realizing an increased optical magnification with a reduced curvature of the image.

Another form of the present invention is to provide a head-mount display, which comprises an image display device which is composed of a liquid crystal display, a back light for the liquid crystal display and an optical device for magnifying an image of the liquid crystal display, thereby satisfing the important essential requirements allowing mounting on the head of a user owing to employment of the thin compact light-weight optical device, having a widened visual angle as compared with the conventional head-mounted display and providing a high-quality image without curvature, which may attract an observer as if he is present therein.

Another form of the present invention is to provide a head-mounted display, which uses a pair of the image display units and can be most suitably used for presenting an image of virtual reality or an image for remote control.

BRIEF DESCRIPTION OF THE DRAWINGS

FIG. 6 is an optical device embodying the present invention.

FIGS. 7(A)–7(C) are illustrative of a semitransparent mirror for selecting a circularly polarized light, which is an element of an optical device embodying the present invention, and descriptive of coordinates and rotation of the semitransparent mirror.

FIG. 27 shows a semitransparent mirror for selecting a polarized light, which is manufactured by photolithographic method.

FIGS. 28(A)–(C) are illustrative of an embodiment of the present invention and descriptive of its coordinates and rotation.

PREFERRED EMBODIMENT OF THE INVENTION

Figure 1:
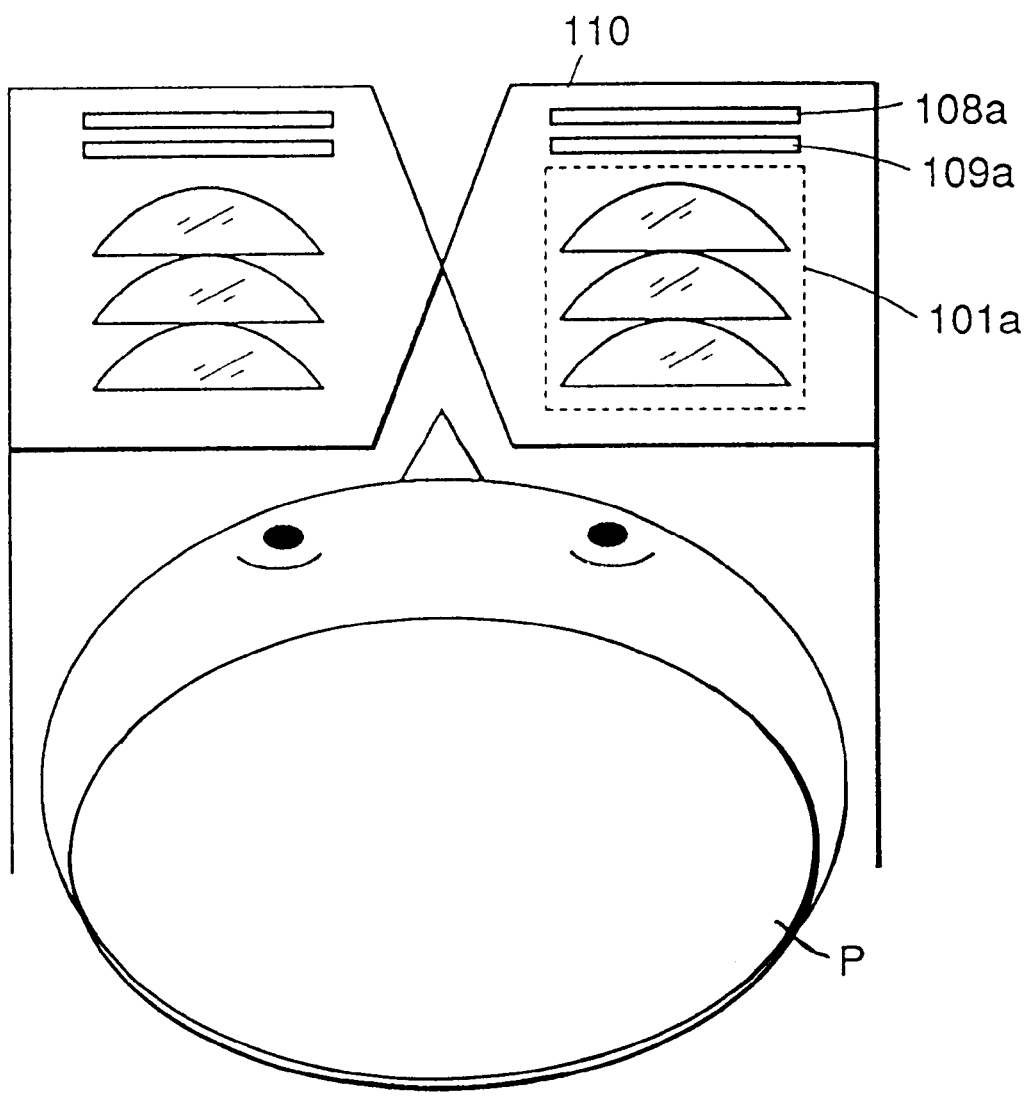
FIG. 1 shows an example of a conventional head-mounted display.

Recently, an increasing interest has been given to head-mounted display units, an example of which is shown in FIG. 1, as means for providing a visual information in a virtual reality and for realizing remote control of various kinds of robots. The essential requirements for such head-mounted display units are: it must have a wide-angle of visibility and a high-resolution power enough to provide visual information with reality and ambience and must be minimized in size and weight enough to be easily worn on a part of the body, particularly, on the head. The head-mounted display shown in FIG. 1 has a spectacle-like casing 110 which is wearable on the head. The casing 110 contains, in each of its lens-parts, a back-light 108a, a liquid crystal panel (liquid crystal display) 109a and a lens 101a, which are arranged in the described order from the outside. The user P can view an enlarged image on the liquid crystal panel 109 in the said head-mounted display as though he looked at the image on a large screen.

With a rapid progress in developing various liquid crystals in the past years, small-sized high-quality liquid crystal panels have been supplied for use in head-mounted display units. However, an optical device which is another main component of the head-mounted display has been insufficiently developed in respect to saving its size and weight.

On the other hand, the head-mounted display units which have been used mainly hitherto in industrial applications and experimental applications of virtual reality, are now finding an increasing demand in home video-games and VTR display units. Accordingly, the saving in size and weight of head-mounted display units is further keenly required.

Figure 2:
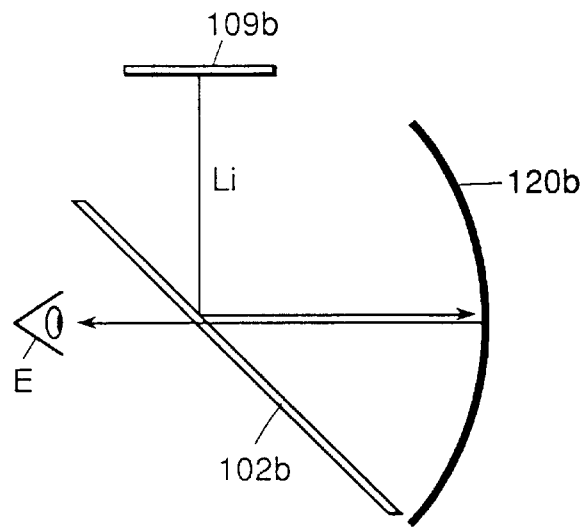
FIG. 2 shows another example of a conventional head-mounted display.

To solve the above-mentioned problems, a conventional device shown in FIG. 2 has been proposed. The head-mounted display shown in FIG. 2 has a liquid crystal display 109b disposed at its top, wherefrom light L goes and reflected backward at semitransparent mirror 102b, then is enlarged by a concave mirror 120b and reflected back to the observer's eye E. In the shown case, the light is folded between the semitransparent mirror 102b and the concave mirror 120b, thereby the optical device used may have a saved size as compared with a linearly arranged device.

Figure 3:
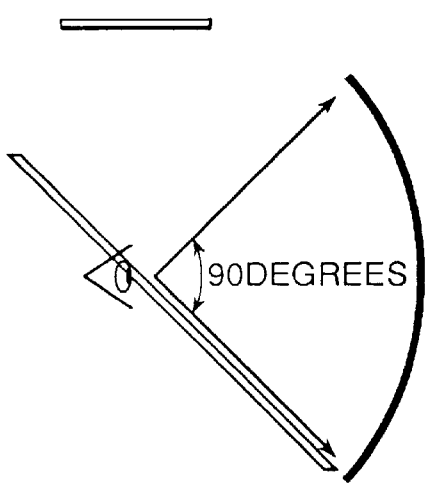
FIG. 3 is illustrative of a working state of the display of FIG. 2.

The prior art device with the liquid crystal panel 109b arranged at the top as shown in FIG. 2, however, has such a drawback that its size saving effect may be realized only with a small angle of visibility. Namely, to increase angle of visibility for obtaining visual information with a high presence, the semitransparent mirror having a larger size must be used in front of the liquid crystal panel, thereby total thickness of the head-mounted display is increased to nullify the size-saving effect of the optical device. In the shown case, as is apparent from FIG. 3, an angle of visibility from an observer is limited to not more than 90 degrees since the observer's eyes can not be advanced toward the concave mirror nearer than the semi-transparent mirror.

Figure 4:
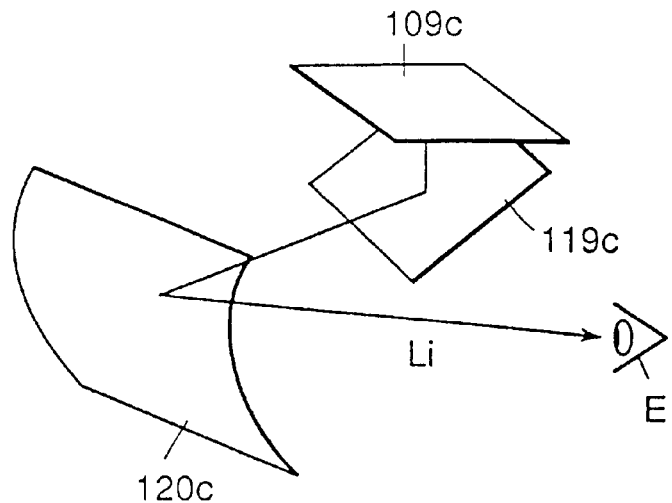
FIG. 4 shows another example of a conventional head-mounted display.

To solve the problem of saving in size and weight of a head-mounted display, a prior art device illustrated in FIG. 4 is disclosed. The head-mounted display of FIG. 4 has a liquid crystal display 109c disposed at its top, wherefrom light L is deflected outwardly by a plane reflecting mirror 119c, enlarged and reflected by a concave mirror 120c and falls into an eye E. In the shown case, the light is folded between the plane reflecting mirror 119c and the concave mirror 120c, thereby the optical device used may have a saved size as compared with a linearly arranged device.

The prior art device with the liquid crystal panel 109b arranged at the top as shown in FIG. 4, however, has a drawback that its size saving effect may be realized only with a small angle of visibility. Namely, to increase angle of visibility for obtaining visual information with a high presence, the semitransparent mirror having a larger size must be used in front of the liquid crystal panel, thereby total thickness of the head-mounted display is increased to nullify the size-saving effect of the optical device.

Figure 5:
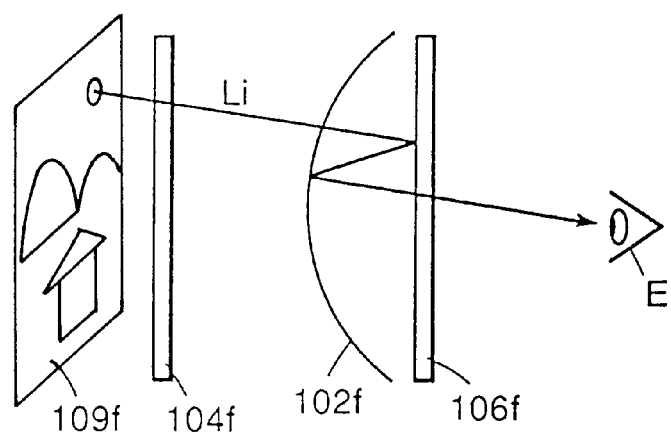
FIG. 5 shows another example of a conventional head-mounted display.

An optical device for use in a head-mounted display must be not only compact and light enough to be easily worn on the user's head but must have a wide angle of visibility and a short focus to provide a vivid image enchanting the observer. FIG. 5 is a construction view of a prior art device intended to solve the above-mentioned problem. A display 109f disposed at the left displays an image from which light rays start and pass a circularly polarizing filter 104f and a concave mirror 102f with a half-mirror and then are reflected at a cholesteric liquid crystal element 106f. The reflected light rays are enlarged and reflected again by a concave mirror 102f and fall into a cholesteric liquid crystal element 106f through which the rays are transmitted to eyes of an observer.

In the shown device, a light path is folded between the cholesteric liquid crystal element 106f and the half-mirror coated concave mirror 102f, thereby the device may have a saved size as compared with a device using an optical system linearly arranged therein.

The present invention is directed to the design of an optical device by using reflected and transmitted light rays and polarized light rays from a semitransparent mirror and selectively transmitting semitransparent mirror while the conventional optical device is directed to use only reflected light rays therefrom.

Accordingly, a semitransparent mirror for selecting circularly polarized light, which is an essential component of the proposed optical devices, will be first described below with reference to FIGS. 7 and 8 being illustrative of working principle of said mirror.

A coordinate system to be used in the further description is first defined as follows:

Referring to FIG. 7(B), the axis being perpendicular to the paper (illustration) and directed to the front is the x-axis, the axis being parallel to the paper and directed upward is the y-axis and the third axis being perpendicular to the x- and y-axes and directed to the right along the paper is the z-axis. A rotation angle is an angle with respect to the y-axis in the x-y plane when viewing in direction of the z-axis in the three-dimensional system of FIG. 7(C). Clockwise rotation is defined as positive.

Definitions on the crystal axis are as follows:

Concerning a quarter-wave plate, it is defined that a polarized light component being normal to the crystal axis is defined as delayed with respect to a polarized light component being parallel to the crystal axis by one quarter wavelength.

Concerning a polarizer plate, it is defined that the plate transmits a polarized light component being parallel to its crystal axis and absorbs a polarized light component being perpendicular to its crystal axis.

The same definitions are used hereinafter in the drawings and description unless otherwise specified.

As shown in FIG. 7(A), in the optical device according to the present invention, a first semitransparent mirror for selecting circularly polarized light is composed of a quarter-wave plate 5, a half-mirror 2 and polarizer plate 4, which are arranged in the described order from the incident light side. Suppose that the crystal axis of the quarter-wave plate 5 is directed along the y-axis (0°) and the crystal axis of the polarizer plate 4 is directed in the direction of 45°. When incident light strikes the circularly-polarized-light selecting semitransparent mirror from the left (of the illustration), its rays are partly reflected thereat and partly passed therethrough in a ratio depending on the direction of rotational movement of the circularly polarized light. The clockwise circularly-polarized light is passed through the quarter-wave plate 5 and simultaneously converted into the linearly polarized light deflected in the direction of −45°. This linearly polarized light strikes the half-mirror 2 which reflects 50% of the light and transmits 50% of the light. The reflected light enters again into the quarter-wave plate 5 by which it is converted into clockwise circularly-polarized light and returned into the incident side. On the other hand, the transmitted light enters into the polarizer plate 4 and is absorbed therein because it is polarized in the direction perpendicular to the crystal axis of the polarizer plate 4. Consequently, the clockwise circularly-polarized light is only reflected and can not pass the circularly-polarized-light selecting semi-transparent mirror.

When counterclockwise circularly-polarized light meets the quarter-wave plate 5 from the left, it is converted into linearly polarized light deflected in the direction of 45°. Rays of the light are divided evenly (by 50%) into two groups, one of them is reflected by the plate and the other is passed therethrough. The reflected light passes again the quarter-wave plate 5 whereby it is converted into counter-clockwise circularly-polarized light and returned into the incident side. On the other hand, the transmitted light that has been linearly polarized in the same direction of the crystal axis of the polarizer plate 4 passes therethrough and passes out the right side thereof.

The characteristics of the circularly-polarized-light selecting semitransparent mirror shown in FIG. 7 are indicated below in Table 1.

TABLE 1

|  | Reflection Coefficient | Transmission Coefficient |
|---|---|---|
| Clockwise Circularly Polarized Light | 50% | 0% |
| Counterclockwise Circularly Polarized Light | 50% | 50% |

As is apparent from Table 1, the circularly-polarized-light selecting semitransparent mirror shown in FIG. 7(A) has different reflection-transmission characteristics depending on the direction of the circular polarization.

Figure 8:
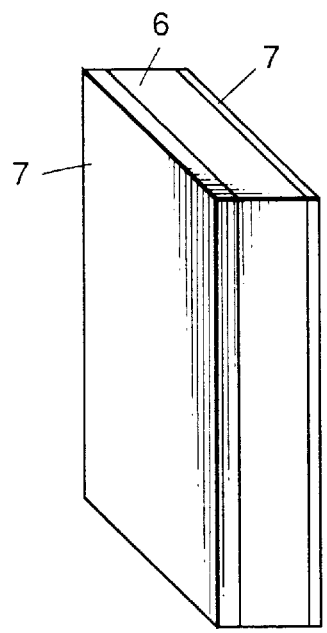
FIG. 8 shows another semitransparent mirror for selecting circularly polarized light.

FIG. 8 shows a circularly-polarized-light selecting semi-transparent mirror which is different in action from the semitransparent mirror shown in FIG. 7. This semitransparent mirror 7 consists of cholesteric liquid crystal 6 sealed between two glass sheets. While the semitransparent mirror shown in FIG. 8 needs two sheets of glass for sealing liquid crystal, it is also possible to use a solidified state of the liquid crystal which needs no glass sheets.

The cholesteric liquid crystal has in itself an ability to selectively reflect clockwise or counterclockwise circularly-polarized light and to transmit a counter-clockwise or clockwise circularly-polarized light, respectively. When the cholesteric liquid crystal is set to reflect clockwise circularly-polarized light, it may allow 100% of counterclockwise circularly-polarized light to pass therethrough in an ideal state. These characteristics of the semi-transparent mirror are shown below in Table 2.

TABLE 2

|  | Reflection Coefficient | Transmission Coefficient |
|---|---|---|
| Clockwise Circularly Polarized Light | 100% | 0% |
| Counterclockwise Circularly Polarized Light | 0% | 100% |

As is apparent from Table 2, the circularly-polarized-light selecting semitransparent mirror shown in FIG. 8 has different reflection-transmission characteristics depending on the direction of the circular polarization and, thereby, it can be used as an effective optical part in embodiments of the present invention.

Accordingly, an optical device according to the present invention can cause only the desired rays of light to reciprocally travel the optical path to and from a semitransparent mirror by adaptively using reflection-transmission characteristics of the latter. Namely, the optical device, in comparison with a conventional one, may have a several-times reduced optical path length and a several-times increased optical power (magnification) owing to the possibility of reciprocating the light through the refracting elements which therefore can exert the same effect as that of several refracting elements.

Optical devices which are preferred embodiments of the present invention will be described below with reference to the related drawings.

FIG. 6 is illustrative of an optical device embodying the present invention, which is composed mainly of a lens 1a with a half-mirror coating applied to one surface thereof and a circularly-polarized-light selecting semitransparent mirror 3a disposed against the non-coated surface of the lens 1a.

In the embodiment shown, the lens 1a is a plano-convex lens with a half-mirror film applied to its convex surface, which is designed to polarize the clockwise circularly-polarized light coming from the left side (see illustration) as follows:

When incident light, which is clockwise circularly polarized, comes from the left side and meets the half-mirror coating 2a on the convex surface of the plano-convex lens 1a, 50% of the light is reflected there from and 50% of the light is passed therethrough. The reflected rays are not used and the transmitted rays are refracted at the convex surface of the lens 1a and travel therein. The refracted rays of the clockwise circularly polarized light pass through the plane surface of the lens 1a and, then, meet the semitransparent mirror 3a which in the embodiment shown reflects the clockwise circularly-polarized light at a specified reflection coefficient of 50% of the semitransparent mirror of FIG. 7 (100% of the mirror of FIG. 8).

The reflected rays reach again the convex surface of the lens 1a where 50% of the rays are reflected at the half-mirror coating 2a and 50% of the rays are passed therethrough. The transmitted rays are not used and only the reflected rays are used, whose polarizing direction has been changed by the effect of reflection to become counterclockwise circularly-polarized light. The light rays then pass through the plane surface of the lens 1a and reach the semitransparent mirror 3a. The light rays having passed therefrom are emitted from the optical device. The transmission coefficient of the semitransparent mirror 3a is 50% in the case of FIG. 7 and 100% in the case of FIG. 8.

It is known that, when two curved surfaces having the same radius of curvature are used, one for reflecting action and the other for refracting action, the latter may have about 4 times greater optical power than the former. In the above-mentioned embodiment, incident light is subjected to one refracting action and one reflecting action of the half-mirror coating 2a of the convex surface of the lens 1a while making 1.5 round trips between both surfaces thereof. In this case, the lens 1a exerts 5 times more optical power than a single refracting lens. In other words, the proposed optical device, in comparison with the conventional device composed of a plurality of serially disposed lenses, may have the same optical power with an optical path reduced by the factor of 5. This may realize savings in size and weight of the optical device.

The circularly-polarized-light selecting semi-transparent mirrors shown in FIGS. 7 and 8 have different values of incident light efficiency. For example, the semitransparent mirror shown in FIG. 7 in the above-mentioned embodiment loses half of the light at each of the reflecting stages, passing only 1/16 (=6.25%) of the incident light. The semi-transparent mirror shown in FIG. 8 utilizes half of the light at the half-mirror and all of the light at the reflecting and refracting portions and, therefore, passes 1/4 (=25%) of the incident light. Accordingly, an optical device using the semitransparent mirror of FIG. 8 in particular may produce an image with considerably increased luminance. The semitransparent mirror of FIG. 7 can be most easily manufactured by using available materials.

Figure 10:
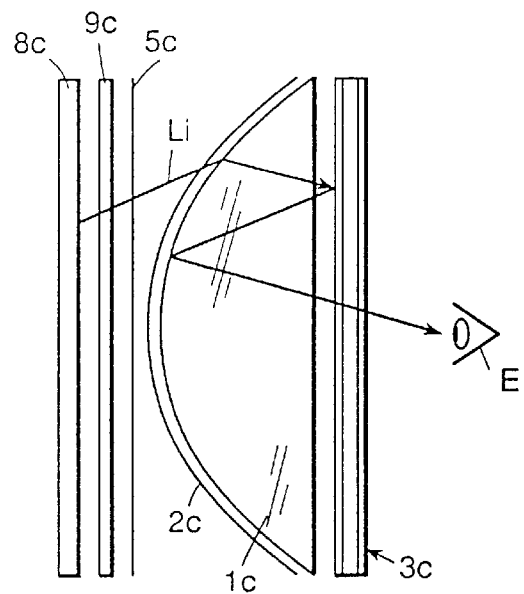
FIG. 10 is a view showing an essential portion of a head-mounted display including an optical device according to the present invention.
Figure 11:
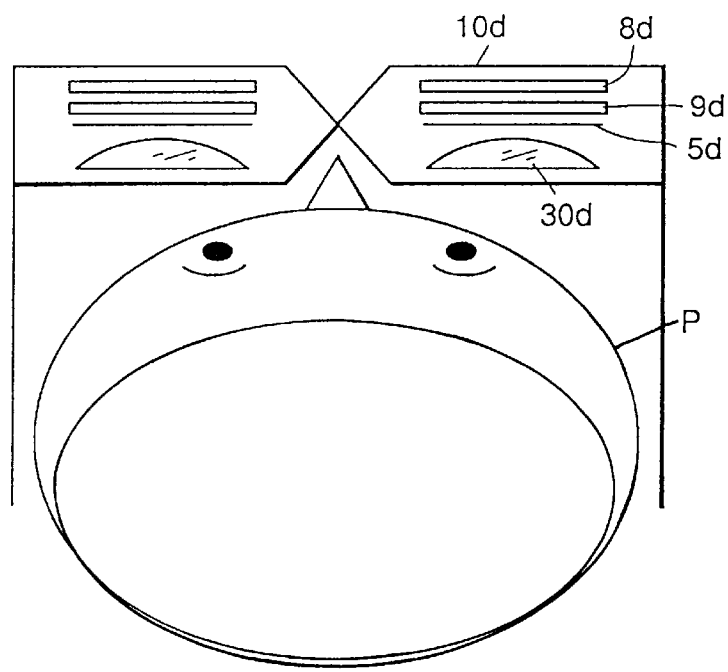
FIG. 11 is illustrative of a head-mounted display having a pair of said optical devices.

Referring to FIGS. 10 and 11, a head-mounted display which uses the above-mentioned optical device according to the present invention will be described as follows:

The head-mounted display is an eyeglass-like case 10d wherein all components are contained. The head-mountable eyeglass-like case 10d contains, in each of two portions corresponding to two lenses of eyeglass, a back light 8d, liquid crystal panel 9d, a quarter-wave plate 5d and an optical device 30d in said order from the front outside. A user P can see an enlarged image of the liquid crystal panel. In FIG. 11, the optical device 30d contains a semitransparent mirror (not shown) which is shown in detail in FIG. 10.

In FIG. 10, the liquid crystal panel 9c may be a generally used twisted nematic type liquid crystal panel through which light is passed, being linearly polarized in a direction along the y-axis light. The crystal axis of the quarter-wave plate 5c is supposed to be in the direction of −45°. The propagation of light in the device will be described below:

The light starting from the back light 8c passes through the liquid crystal panel 9c, being converted into linearly polarized light carrying the image information. The light is then converted to clockwise circularly polarized light while passing through the quarter-wave plate 5c. Rays of the light travel to the optical device shown in FIG. 10, which comprises a plano-convex lens 1c with a half-mirror coating 2c applied to its convex surface and a circularly-polarized-light selecting semitransparent mirror 3c attached to the plane surface of the lens 1c. The semitransparent mirror 3c is composed of a cholesteric liquid crystal sandwiched between two glass-substrates (or plastic substrates).

Figure 9:
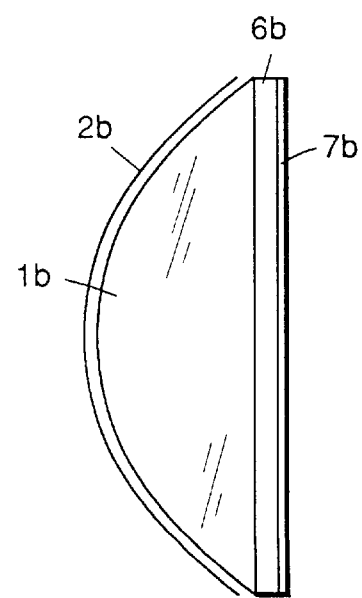
FIG. 9 is an optical device embodying the present invention.

The semitransparent mirror 3c used in this embodiment is manufactured by homeotropically aligning molecules of the cholesteric liquid crystal on one treated glass substrate and over-laying thereon the other treated glass substrate. It is also possible to integrally manufacture a semitransparent mirror with a plano-convex lens 1b by sandwiching the cholesteric liquid crystal 6b between a plane surface of the lens 1b and a glass substrate 7b as shown in FIG. 9.

In FIG. 10, the clockwise circularly polarized light Li coming from the left (when looking at the illustration) strikes the half-mirror coat 2c on the convex surface of the lens 1c: half (50%) of the light is reflected therefrom and the other half (50%) of the light is passed therethrough. The reflected rays are not used. The transmitted rays are refracted at the convex surface of the lens 1c and travels therein. The refracted rays of the clockwise circularly polarized light pass through the plane surface of the lens 1c and, then, meet the circularly-polarized-light selecting semitransparent mirror 3c which in the embodiment shown reflects the clockwise circularly-polarized light with a reflection coefficient of 100%. The reflected light arrives again at the convex surface of lens 1c and 50% of the light is reflected at the half-mirror coating 2c and 50% of the light is passed therethrough. The transmitted rays are not used and only the reflected rays are used, whose polarization direction has been reversed by the effect of reflection and becomes counterclockwise circularly-polarized light. The light rays then pass through the plane surface of the lens 1c and strike the semitransparent mirror 3c. The light rays having passed therethrough are emitted from the optical device.

As described above, the incident light is subjected to one refracting action and one reflecting action at the convex surface of the lens 1c while making 1.5-round trips between the convex surface of the lens 2c and a surface of the semitransparent mirror 3c. In this case, the lens 1c exerts 5 times more optical power than a single refracting lens. In other words, the proposed optical device, in comparison with a conventional device composed of a plurality of serially disposed lenses, may have the same optical power with an optical path reduced by the factor of 5. This may realize savings in size and weight of the optical device.

The design of an optical device for use in the above-described head-mounted display according to the present invention will be described below:

The head-mounted display requires placing therein two optical devices disposed in front of the respective eyes of a user. A pair of 60 mm. dia. lenses is used since an average distance between human eyes is 63 mm. Since standard liquid crystal displays are sized in the range of 1.5 to 2 inches, the specification of a single lens constituting the optical device is determined as follows:

Form: Glass-made plano-convex lens
Focal length: 120 mm.
Radius of curvature of convex surface: 60 mm.
Center thickness: 10 mm.

Figure 12A:
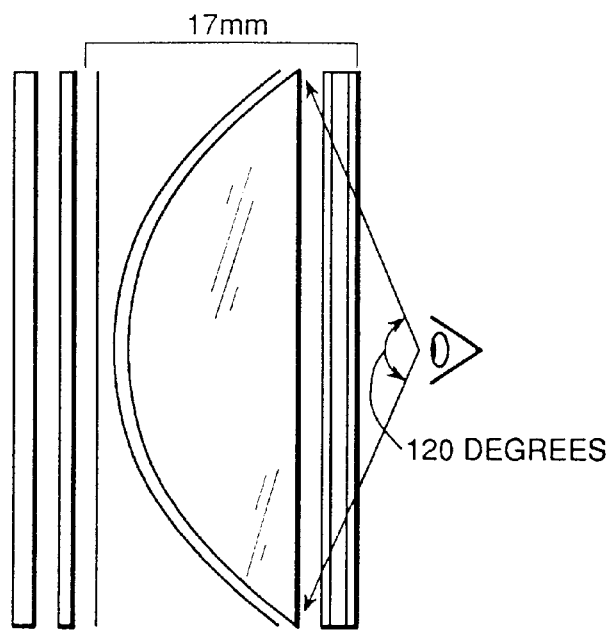
FIG. 12A is illustrative of a head-mounted display embodying the present invention.

FIG. 12A is a design drawing of the optical device manufactured using the above-mentioned lenses, which is used in the shown embodiment of the present invention. The specification on the optical device is as follows:

Resultant focal length: 23 mm.
Field-of-view: 120 degrees
Thickness from display surface to lens surface: 17 mm.
Weight: 48 gr.

Figure 12B:
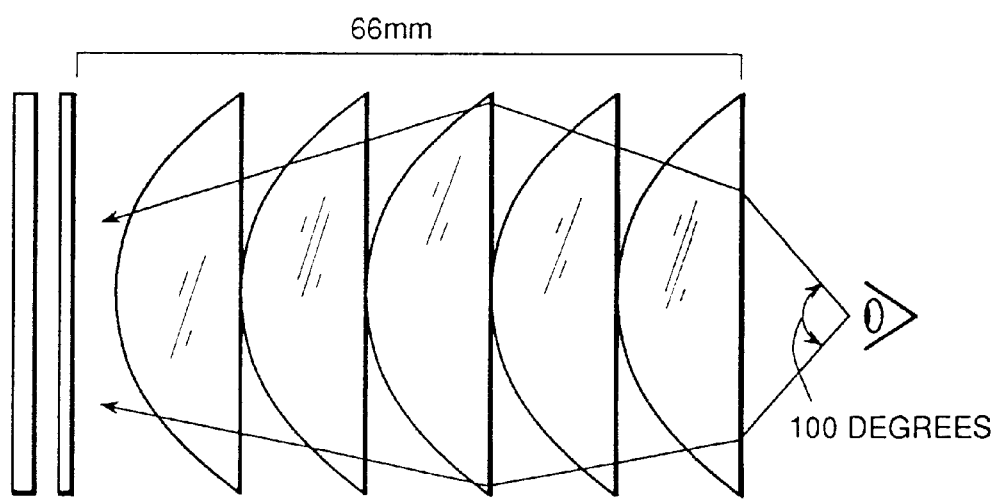
FIG. 12B is illustrative of an example of a conventional display (B).

In FIG. 12B, for comparison with FIG. 12A, there is shown a design drawing of a conventional optical device which comprises two parallel-disposed lens-systems, each consisting of 5 single lenses disposed in series to get the same magnification that the optical device of FIG. 12A has. The specification on this conventional optical device is as follows:

Resultant focal length: 29 mm.
Field-of-view: 100 degrees
Thickness from display surface to farthest lens surface: 66 mm.
Weight: 240 gr.

Comparison of FIGS. 12A and 12B makes it clear that the optical device of FIG. 12A realizes a saving in thickness of 49 mm. and a saving in weight of 192 gr. per eye (by 384 gr. for both eyes) with an increased magnification and field-of-view as compared with the conventional optical device. It was very difficult to make the conventional optical device have a wide field-of-view, e.g. 120°, because this may increase the thickness of the device. On the other hand, the optical device according to the present invention can get an increased field-of-view with a minimal increase in its thickness. This feature is an essential advantage of the proposed optical device in its practical application.

Namely, a head-mounted display must be designed to be comfortable to use by reducing its size (with a minimal protrusion of the lens portion) and its weight (with a minimal load to the user's face). Such a comfortable thin-and-light head-mounted display can be realized by using the optical device according to the present invention, which is featured by its wide field-of-view and reduced thickness (¼ in the case of FIG. 12A as compared with the conventional optical device).

Figure 13A:
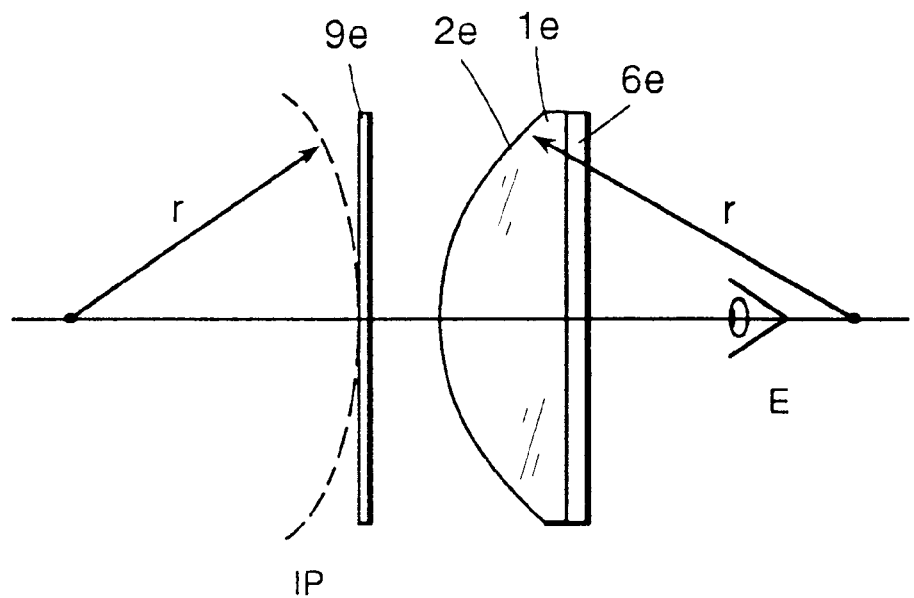
FIG. 13A is a view for explaining the function of an optical device embodying the present invention.
Figure 13B:
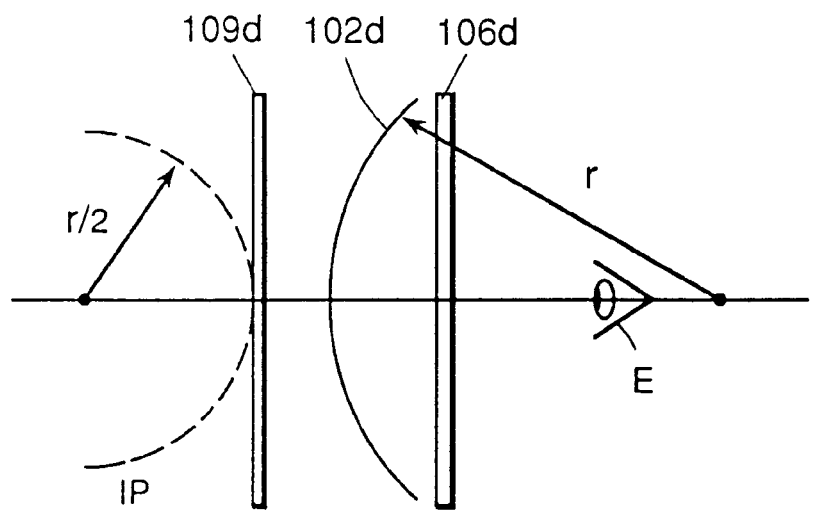
FIG. 13B is a view for explaining the function of an example of a conventional optical device.
Figure 14A:
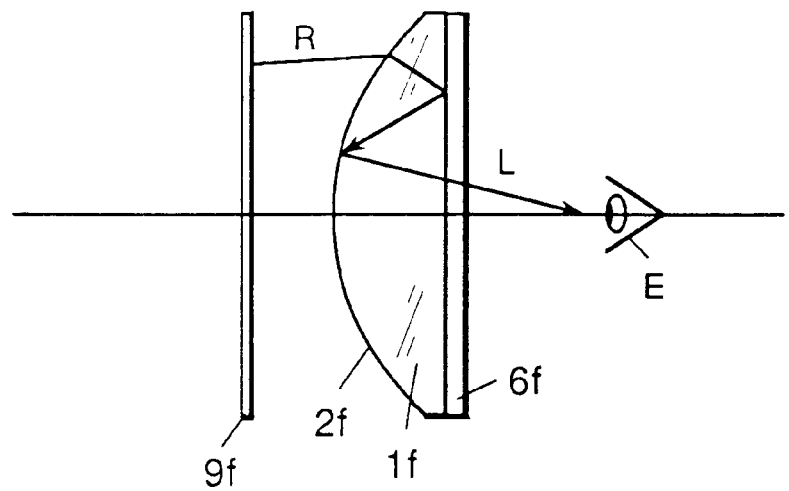
FIG. 14A is a view for explaining the function of another optical device embodying the present invention.

FIGS. 13A and 14A are views for explaining preferred embodiments of the present invention and their features. FIG. 13B is a view of a conventional optical system composed of a concave half-mirror 102d and a cholesteric liquid crystal element 106d facing each other with an air gap therebetween. An image of a display 109d can be viewed as being enlarged by the user (E). The image, however, will in general be constantly focused not at a plane but at a curved surface called the Petzval image surface IP, whose curvature radius is called the Petzval radius representing a degree of curvature of the curved image surface. When an image is focused at a Petzval surface of a small Petzval radius, (i.e., at a highly curved surface), its center portion is in focus but its peripheral portion is out of focus because of increasing distance between the Petzval image surface and the display. In the conventional optical system, the Petzval image surface has a Petzval radius of r/2, calculated according to a known formula, where the radius of curvature of the concave mirror 102d is "r". This value is very small.

Referring to FIG. 13A, an optical device, which is an embodiment of the present invention, comprises a plano-convex lens 1e with a half-mirror coating 2e applied to its convex surface and a cholesteric liquid crystal element 6e attached close to a plane surface of the plano-convex lens 1e. This optical device differs from the prior art device in that a space between the convex surface and the plane surface is filled with glass or plastic material serving as a refractor. The Petzval radius of this optical device is calculated to be "r". Namely, the degree of curvature of the image surface can be reduced by ½ by using the refracting material. The optical device thus constructed can produce an image surface being more in focus.

A super-wide-angle short-focusing optical system for use in a head-mounted display, which could not be manufactured because of increased curvature of the image surface, can be now realized according to the present invention. A head-mounted display using the optical device provided by the present invention may produce images with an increased sense of presence for the user.

Figure 14B:
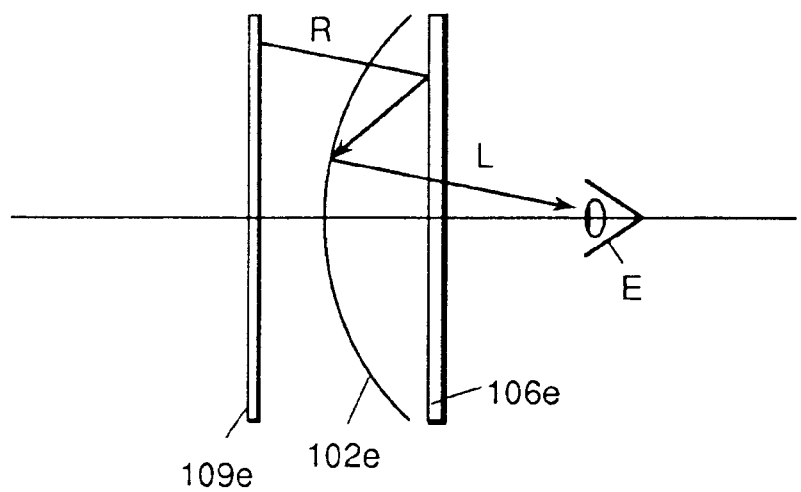
FIG. 14B is a view for explaining the function of another example of a conventional optical device.
Figure 15:
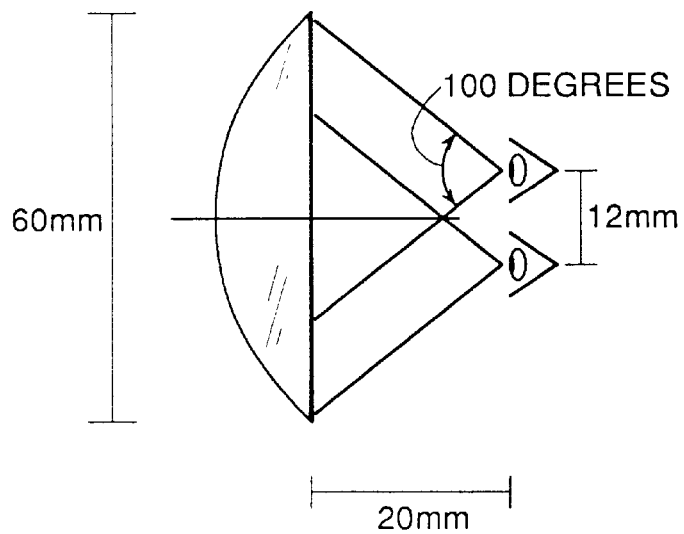
FIG. 15 is a view for explaining a required specification of a head-mounted display.

Referring to FIGS. 14A and 14B, other effects of the above-mentioned embodiment of the present invention will be described as follows:

FIG. 14B relates to a prior art device wherein light emitted from a display 109e is clockwise circularly polarized light R (to be generated in practice when a circularly polarized light filter or a quarter-wave plate is disposed in front of the display 109e). The light first passes through a half-mirror coated concave mirror 102e and arrives at a cholesteric liquid crystal element 106e which has a property to reflect all circularly polarized light having one polarized direction and transmit all circularly polarized light having the other polarizing direction. The cholesteric liquid crystal element 106e is assumed to have been designed to reflect the clockwise circularly polarized light R. Therefore, the light R is totally reflected therefrom and arrives again at the half-mirror coated concave mirror 102e. The light is magnified and, at the same time, is reflected therefrom, changing its polarized direction to counterclockwise. The counterclockwise polarized light L reflected therefrom arrives at the cholesteric liquid crystal element 106e which this time allows all of the light to pass therethrough because the light is counterclockwise circularly polarized. The light L then falls on the user's eye (E). Accordingly, with the display 109e disposed near the focus of this optical system, the user can observe a magnified virtual image of the display 109e. In this case, the power (a reciprocal of the focal length) of the optical system exists only in the concave mirror 102e having a radius "r" of curvature and its value is equal to 2/r.

FIG. 14A shows the embodiment of the present invention, wherein light is assumed, like the case of the prior art device to be a circularly polarized light emitted from a display 9f. This incident light passes through the convex surface of a plano-convex lens 1f, being refracted thereat, and travels therein toward the adjacent thereto cholesteric liquid crystal element 6f whereby the light is reflected back. The reflected light is then enlarged and reflected by the internal concave surface of the half-mirror-coated plano-convex lens 1f and arrives again at the cholesteric liquid crystal element 6f. In this point, the light passes the element 6f and falls onto the user's eyes E. The shown embodiment differs from the prior art by the following two points: first, the incident light is refracted when first passing through the lens 1f by a convex surface thereof, and second, reflection of light at the inner convex surface is conducted in glass or plastic which have a refractive index larger than that of air. Owing to these features, the optical system of the shown embodiment has an increased power and a reduced focal length with the same configuration as that of the prior art lens system.

These advantages can be evaluated as follows:

When the convex surface of plano-convex lens 1f has the same curvature radius "r" as that of the prior art and the refractive index of the glass or plastic medium is equal to 1.5, the lens can exert the optical power of 0.5/r to refract the light and the optical power of 3/r to reflect the light at the inner concave surface. Accordingly, the resultant optical power of the lens of thickness t is within the range from 3/r to 3.5/r when t<=r/4. Namely, according to the present invention, it is possible to provide an optical system whose optical power is 1.5 to 1.75 times that of a similarly formed conventional optical system and whose focal length is correspondingly shortened. Application of a thus designed optical system to a head-mounted display is particularly effective to create a highly magnified super-wide angle image with an increased sense of reality, in a casing which is the same in size as the conventional device. An example of more detailed evaluation will be done for another embodiment of the present invention.

A further improved optical device can be obtained by forming cholesteric liquid crystal as a thin film on a plane surface of a plano-convex lens instead of using the cholesteric liquid crystal element. One method for forming a cholesteric liquid crystal film on the plane surface of a plano-convex lens is described as follows:

A mixed solution of cholesteric liquid crystal monomer and initiator is prepared and applied uniformly to the plane surface of the plano-convex lens. The mixed solution applied to the plane surface of the lens is then subjected to radiation by ultraviolet light. The cholesteric liquid crystal polymerizes to form a solid film thereon.

A head-mounted display constructed as shown in FIG. 11 must be required in particular to use an optical system that has a reduced size and weight and has a minimized distortion. An optical system according to the present invention, which is intended for use in a head-mounted display, will be described below and compared with a conventional optical device.

The required specification of the optical device is first determined as follows:

A visual field necessary for a user to experience subjective immersion in a scene is considered to be in the range of 100°. Accordingly, the diagonal of the visual field must be 100° to produce an intense impression of reality for a displayed image in the head-mounted display. An exit pupil of 12 mm. is required for the eyes to see the entire visual field. An eye relief must be 20 mm. for enabling a spectacled user to look at the image. A small 1.6-inch type liquid crystal panel is used for saving the weight of the display whose diagonal size is 40 mm.

The necessary values of a lens diameter and focal length are determined according to the above-mentioned conditions. To assure the 100-degree visual field from any point of the exit pupil, the lens must have a diameter of 60 mm. that is determined according to the following equation.

$$\text{(Lens Diameter)} = \text{(Exit Pupil Diameter)} + 2 \cdot \text{(Eye Relief)} \cdot \tan[\text{(Visual Field Angle)}/2] \tag{1}$$

The lens must have a short focal length of 16.8 mm., which has been calculated according to the following equation (2).

(Focal distance)=(Panel Diagonal Size)//(2* tan[(Visual Field Angle)/2])     (2)

The above-mentioned specification is tabulated below in Table 3.

TABLE 3

| Item | Values |
| --- | --- |
| Diagonal Field-of-View | 100° |
| Exit Pupil | 12 mm. |
| Eye Relief | 20 mm. |
| Diagonal Size of Panel | 40 mm. |
| Lens Diameter | 60 mm. |
| Focal Distance | 16.8 mm. |

Figure 16:
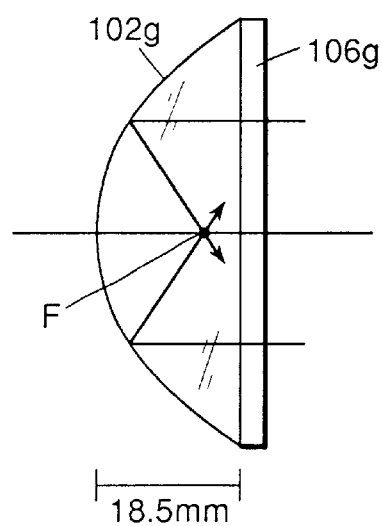
FIG. 16 shows an example of a conventional optical device having the same required specification.

Two optical systems which satisfy the above-described requirements are designed, one according to the present invention and the other according to the prior art and are compared with each other in their performance. The prior art device comprises a half-mirror-coated concave mirror 102g and a cholesteric liquid crystal element 106g as shown in FIG. 16. As described before, a display image is magnified by the optical power of the concave mirror 102g to produce a virtual image that the user views. The concave mirror 102g must be designed to have its curvature radius of 33.6 mm. as the focal distance of the optical system must be 16.8 mm. Such a design, however, can not be realized because the concave mirror 102g must be of 18.5 mm. in thickness at which its focal point F exists inside the mirror. Namely, the display can not be placed at the focal point. Consequently, the shortest focal distance of the prior art device is determined at 22.7 mm. according to the following equation (3).

$$(\text{Focal distance}) = 2 * (\text{Concave Mirror Thickness}) \quad (3)$$

$$(\text{Concave Mirror Curvature Radius}) = 2 * (\text{Focal distance})$$

$$(\text{Concave Mirror Thickness}) = (\text{Concave Mirror Curvature Radius}) -$$
$$\sqrt{(\text{Concave Mirror Thickness})^2 - (\text{Lens Radius})^2}$$

A maximal visual field angle that the prior art device can attain at the shortest focal distance is determined to be 83 degrees which can not satisfy the required specification.

Figure 17:
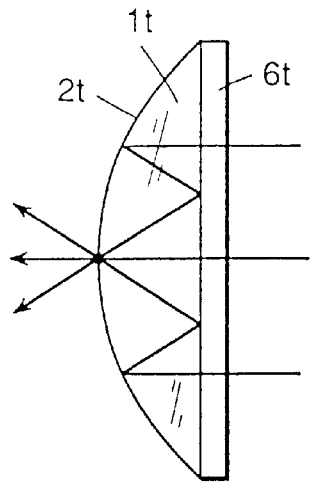
FIG. 17 is an optical device embodying the present invention.

An optical system which satisfies the same requirements is designed according to the present invention. FIG. 17 is illustrative of the designed optical system which differs from the prior art system by filling a space between a concave mirror 2t and a cholesteric liquid element 6t with an acrylic resin it serving as light-refractor whose refractive index is 1.49. When the optical system has the same configuration as that of the prior art system of the maximal visual field, it can get a focal distance of 15.2 mm. owing to the effect of acrylic resin it and a visual field angle of 106° which is wide enough to satisfy the requirement.

Petzval radii of the prior art device and the device of the present invention are calculated to study degrees of their image surface curvature IP. The Petzval radius of the device according to the present invention is 45.1 mm. while the Petzval radius of the prior art device is 22.5 mm. This means that the device according to the present invention is superior in image quality to the prior art device by a factor of two. Table 4 is a comparison table for comparing properties of the two optical systems.

TABLE 4

| | Optical Systems according to: | |
| --- | --- | --- |
| Items | Prior Art | Present Invention |
| Diameter | 60 mm. | 60 mm. |
| Thickness | 11.35 mm. | 11.35 mm. |
| Focal Distance | 22.7 mm. | 15.2 mm. |
| Visual Field Angle | 83° | 106° |
| Petzval Radius | 22.7 mm. | 45.1 mm. |

Figure 18:
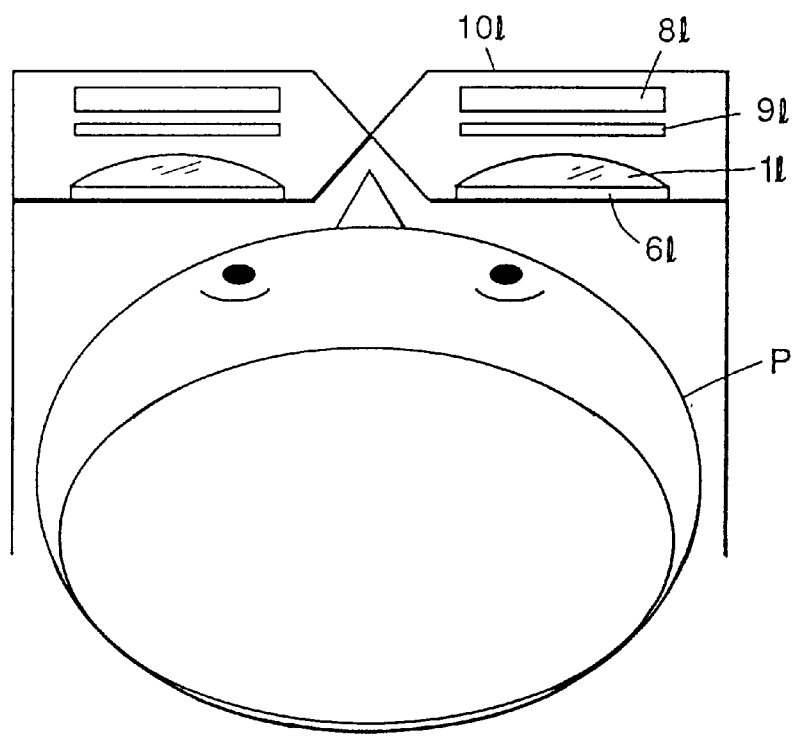
FIG. 18 shows a head-mounted display using the optical device shown in FIG. 17.

As is apparent from Table 4, the present invention can provide an optical device which, being of the same size as that of the prior art device, has a super wide angle of view that can not be realized by the prior art and assures twice the image quality of the prior art. Accordingly, a head-mounted display using the optical system according to the present invention, which, as shown in FIG. 18, has an eyeglass-like casing containing therein a back light 8l, a liquid crystal panel 9l and an optical device 1l, 6l disposed in the described order, can display an image with such an increased effect of realism and intensity as a user could not have experienced with any conventional head-mounted display.

The present invention is also directed to designing an optical system which is capable of using a combination of rays of light transmitted and reflected from a semitransparent or selective semitransparent mirror according to their polarized properties, as opposed to the conventional device using only reflected light. The way of realizing the present invention is similar to the before-mentioned embodiment.

Figure 19:
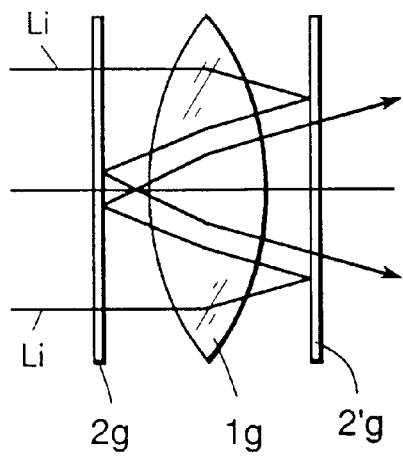
FIG. 19 is a mimic view for explaining the function of an optical system according to the present invention.
Figure 20:
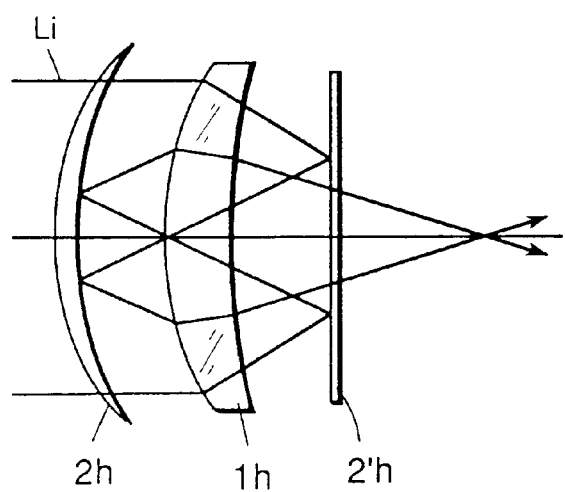
FIG. 20 is another mimic view for explaining an optical system according to the present invention.

FIGS. 19 and 20 are diagrams for explaining working principles of optical systems, each being an important element constituting an optical device according to the present invention.

The optical system shown in FIG. 19 is so designed that two semitransparent mirrors 2g and 2'g disposed opposite to each other and a ray Li among rays of light making one and half rounds therebetween, starting from the radiation-side semitransparent mirror, by adaptively devising the action of the transmission and reflection of the ray with changing direction of its polarization. Namely, a thus designed optical system in comparison with the conventional device has a light path reduced by a factor of 3 and a three-times increased optical power (magnifying factor) of its refraction since the ray is subjected to the same refracting actions as when it passes through three refractors 1g.

The optical system shown in FIG. 20 includes two semitransparent mirrors 2h and 2'h disposed opposite to each other, either one or both of which may be a curved mirror (2h in this case) or curved mirrors. These mirrors 2h, 2'h are adaptively designed in view of the polarizing direction of light in the optical system. By doing so, it is possible to lighten the load of the refractor 1h used between the semitransparent mirrors 2h, 2'h. The optical design becomes more flexible. The weight of the optical system can be saved (generally by giving the necessary curvature to the semitransparent mirrors 2h and 2'h rather than the refracting means 1h).

However, the optical systems of FIGS. 19 and 20 are mimically illustrated for convenience of explanation of their basic actions and therefore can not be practically used as they are because, besides the necessary rays, there may be other rays directly passing the semitransparent mirrors and making more than 2.5-round trips, causing ghosting and a halation of the image. Optical systems of the embodiments of the present invention, which has solved the above-mentioned problems, will be described below in detail.

Figure 21A:
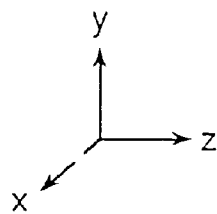
FIGS. 21(A)–21(C) are illustrative of an embodiment of the present invention and descriptive of its coordinates and rotation.
Figure 21B:
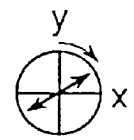
Figure 21C:
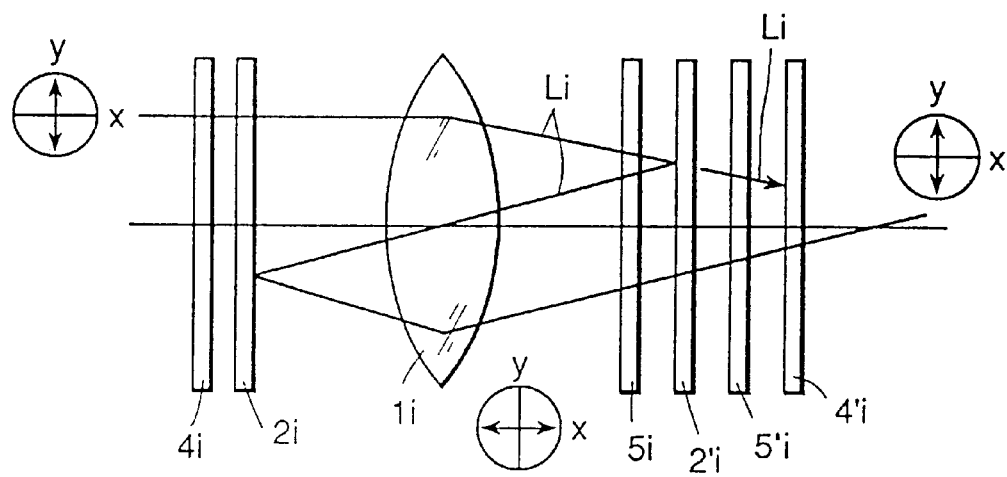

Referring to FIG. 21(C), an optical system embodying the present invention is first described according to the same definitions on coordinate axes and rotation angle as determined before (see FIGS. 21(A) and 21(B)).

The optical system of FIG. 21(C) comprises a first polarizer plate 4*i*, a first semitransparent plate 2*i*, a refractor 1*i*, a first quarter-wave plate 5*i*, a second semitransparent plate 2'*i*, a second quarter-wave plate 5'*i* and a second polarizer plate 4'*i*, which are arranged in the described order from the left (incident side as see the illustration) in such a way that respective optical elements are included in a x-y plane and are normal to an optical axis Ax of the optical system. The first and second polarizer plates 4*i* and 4'*i* are disposed so that polarized light passing therethrough may be in the y-axis direction, and the first and second quarter-wave plates 5*i* and 5'*i* are disposed so that their crystal axes may form an angle of −45° to the y-axis.

Reflection and transmission of a ray of incident light in the shown optical system are as follows:

Light having entered from the left side into the first polarizer plate 4*i* is converted to light linearly polarized in the direction of the y-axis. The polarized light passes the first semitransparent mirror 2*i* and the refractor 1*i* (first pass). When the light further passes the first quarter-wave plate 5*i*, it is converted to circularly polarized light which is then divided by the second semitransparent mirror 2'*i* into two groups of rays: one group L*i* directly passes therefrom and the other group L'*i* is reflected thereat. The directly transmitted light L*i* is converted again by the second quarter-wave plate 5'*i* to linearly polarized light. Since the first and second quarter-wave plates 5*i* and 5'*i* have their crystal axes in the same direction, the directly transmitted light has been subjected to the same polarization it would have if passing through a half-wave plate, and the final direction of this linearly polarized light is rotated by 90° to coincide with the direction of x-axis. Namely, the linearly polarized light changes its polarization direction by 90° when it passed through two quarter-wave plates and, therefore, is then absorbed by the second polarizer plate 4'*i*. Impairment of a display image by the directly transmitted light L*i* can be thus prevented.

On the other hand, the light L'*i* reflected by the second semitransparent mirror 2'*i* passes again the first quarter-wave plate 5*i* being converted to light linearly polarized in the x-axis direction. The linearly polarized light then passes again (second pass) through the refractor 1*i* and reaches to the first semitransparent mirror 2*i* by which it is reflected again as is linearly polarized in the same x-axis direction (since the direction of its polarization can not be changed by reflection). The light passes through the refractor 1*i* (third pass) and then passes through the quarter-wave plate 5*i* being converted to circularly polarized light whose rays are then divided by the second semitransparent mirror 2'*i* into two groups: one group L'*i* passes therethrough and the other group is reflected thereat. The passing light L'*i* is converted by the second quarter-wave plate 5'*i* to linearly polarized light whose direction meets with y-axis because the light has passed through the quarter plates 5*i* by two times more than the directly transmitted light L*i*.

Consequently, the light L'l passes through the second polarizer plate 4'*i* and will be used by an optical device or by an observer. The light reflected at the second semitransparent mirror 2'*i* (like the previously reflected light) travels between the semitransparent mirrors and returns to the second semitransparent mirror 2'*i* and passes therethrough. The light has passed two times through the quarter-wave plate 5*i* and been polarized in the x-axis direction, and hence is absorbed by the second polarizer plate 4'*i*. Impairment of a display image by the 2.5-round traveled light can be thus prevented.

The light emitted from the shown optical system for further use in an optical device is defined as signal light and other light that may impair an image is defined as noise light. Table 5 shows the results of further examination of light rays passing through the semitransparent mirrors of the optical system.

TABLE 5

| Number of round trips of light between two semi-transparent mirrors or circularly polarized light selecting semi-transparent mirrors | Kinds of Light | Intensity Ratio to Incident Light (Transmission Efficiency) | Intensity Ratio to Signal Light |
|---|---|---|---|
| 0.5 | Noise (Direct light) | 0 | 0 |
| 1.5 | Signal | 1/16 | 1 |
| 2.5 | Noise | 0 | 0 |
| 3.5 | Noise | 1/256 | 1/16 |
| 4.5 | Noise | 0 | 0 |

As is apparent from Table 5, light rays having made 0.5-, 2.5- and 4.5-round trips are all absorbed in the polarizer plate 4'*i* and light rays having made 1.5- and 3.5-round trips pass therethrough without being absorbed. The light having made 1.5-round trips is necessary signal light and the light having made 3.5-round trips is noise light that scatters during its round trips and attenuates to the extent of 1/16 in relation to signal light intensity. Namely, the largest noise light is limited in its intensity to 1/16 of the signal light. The effect of the noise light on a display image can be thus minimized.

Figure 22:
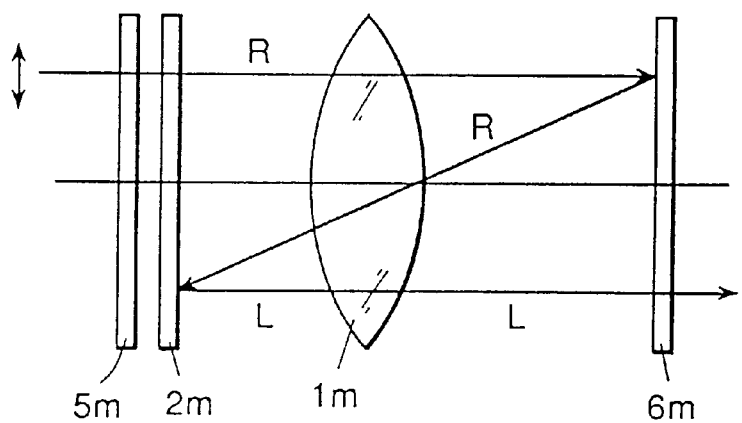
FIG. 22 shows an embodiment of the present invention.

The similar optical system according to the present invention can be realized by using thin films of cholesteric liquid crystal, which is shown in FIG. 22. In the shown system, a cholesteric liquid crystal film 6*m* is intended to reflect clockwise circularly polarized light R and to transmit therethrough counterclockwise circularly polarized light L. Linearly polarized incident light from the left side (as seen in the illustration) comes into the optical system, wherein it is converted by a quarter-wave plate 5*m* to clockwise circularly polarized light R, makes 1.5-round trips between a half mirror 2*m* and a cholesteric liquid crystal film 6*m* and finally passes the latter to the right. The light has passed through the refractor 1*m* three times to receive the same refracting actions that it may receive when passing three refractor. It is possible to change the described direction of the polarized light and the described rotating direction of the circularly polarized light.

Figure 23B:
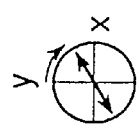
FIGS. 23(A)–23(C) are illustrative of an embodiment of the present invention and descriptive of its coordinates and rotation.
Figure 23A:
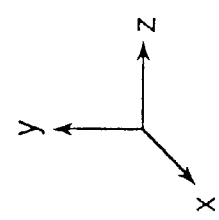
Figure 23C:
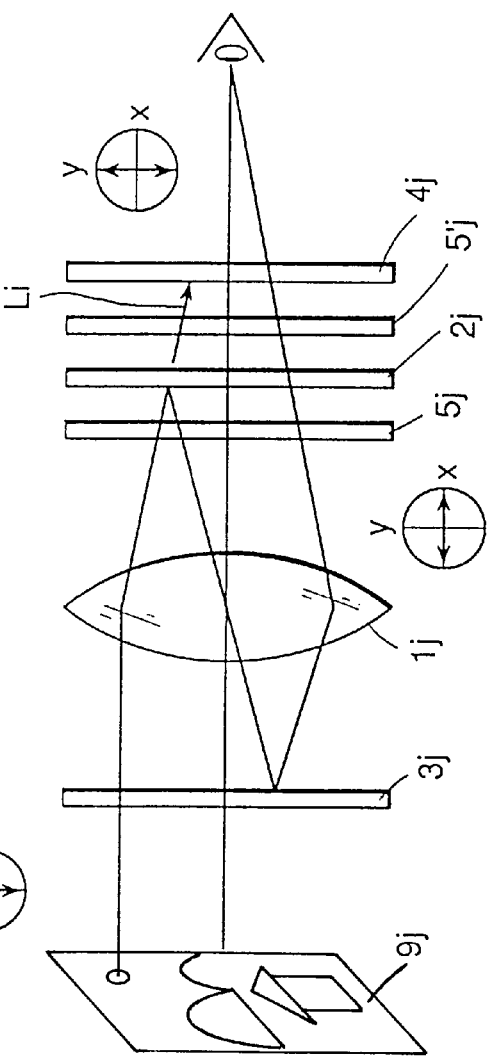
Figure 24:
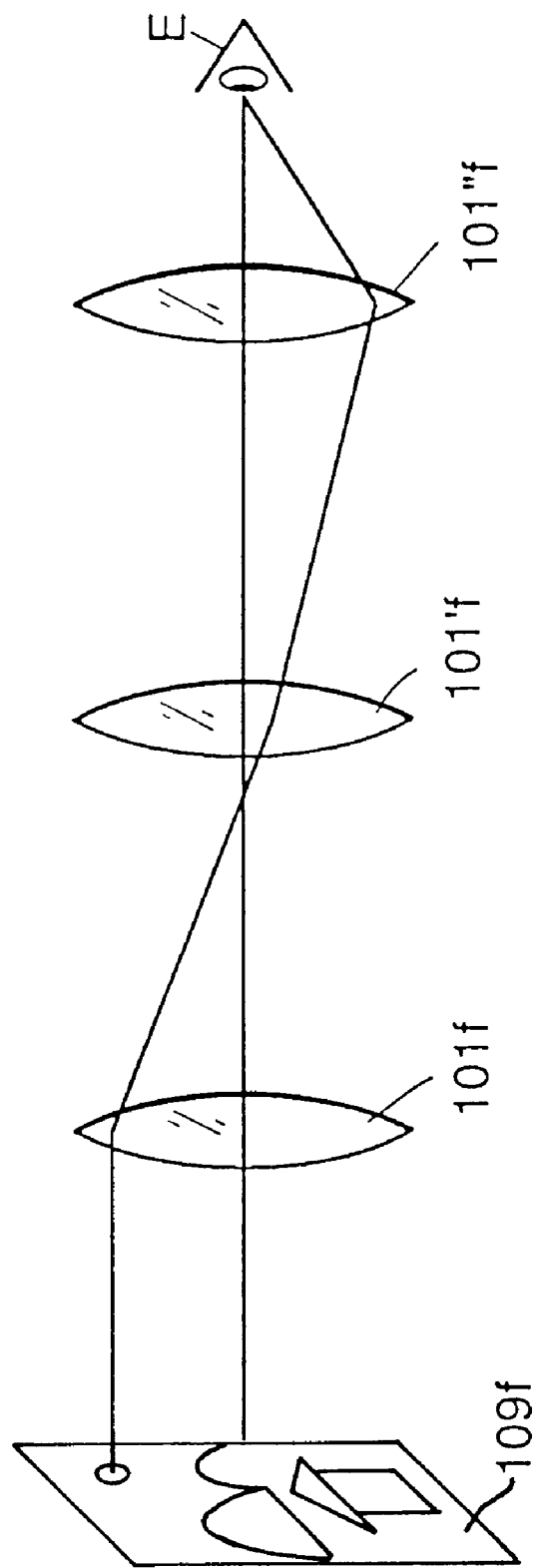
FIG. 24 is an example of an optical device composed of only a conventional lens system.

Referring to FIGS. 23(C) and 24, an optical system embodying the present invention will be described below, using the same definitions on coordinate axes and rotation angle as determined before (see FIGS. 21(A) and 21(B)).

The optical system of FIG. 23(C) comprises a liquid crystal display 9*j*, polarized light selecting semitransparent mirror 3*j*, a refractor 1*j*, a first quarter-wave plate 5*j*, a semitransparent plate 2*j*, a second quarter-wave plate 5'*j* and a polarizer plate 4*j* which are arranged in the described order from the left (incident side as see the illustration) in such a way that respective optical elements are included in a x-y plane and are normal to an optical axis Ax of the optical system. In FIG. 23(C), E denotes the eye of an observer. The polarized light selecting semitransparent mirror 3*j* and the polarizer plate 4j are disposed so that polarized light passing therethrough may be in the y-axis direction, and the first and second quarter-wave plates 5j and 5'j are disposed so that their crystal axes may make an angle of −45° with the y-axis.

Figure 25:
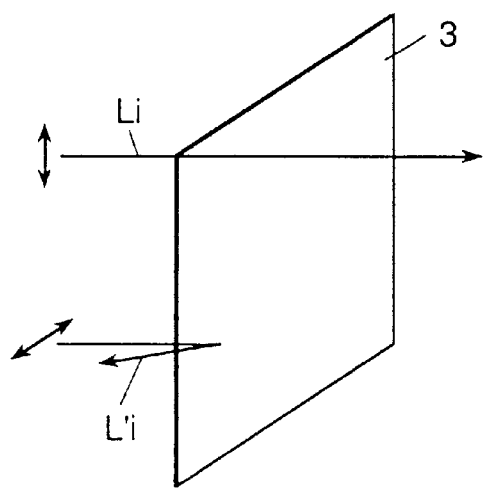
FIG. 25 is illustrative of a semitransparent mirror for selecting a polarized light.

This optical system differs from the optical system of FIG. 21 by that it uses the polarized light selecting semitransparent mirror 3j in place of the first polarizer plate 4'j and semitransparent mirror 2i of the system of FIG. 21. As shown in FIG. 25, the polarized light selecting semitransparent mirror 3j is a mirror that transmits 100% of light linearly polarized in a specified direction and reflects 100% of light linearly polarized in a perpendicular thereto direction. For example, the light selecting semitransparent mirror 3j of FIG. 25 transmits horizontally polarized light Li and reflects vertically polarized light L'i relative to the illustration.

Figure 26:
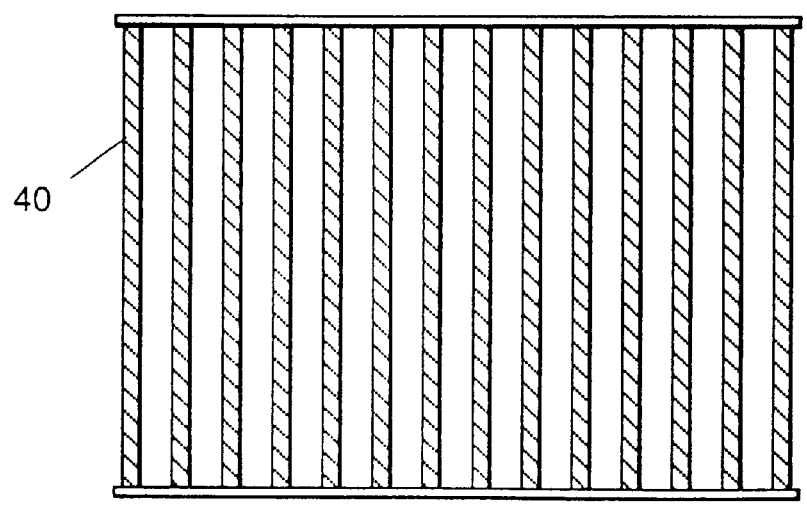
FIG. 26 shows a metal-made wire grating.

This polarized light selecting semitransparent mirror 3 can be manufactured by using the same principle of making a metal-wire grating which is a frame-like element with close equally spaced parallel metal wires 40, as illustrated in FIG. 26. It was developed for use in experiment on polarization of radiowaves. The metal-wire grating functions as a polarizing element when a clearance between metal wires is distinctly shorter than the radiowave length and the wire material has a radio-wave reflecting property. The grating reflects polarized light whose direction is parallel to the row of the metal wires and transmits polarized light whose direction is perpendicular to the row of the metal wires. Other elements can similarly work with light if they have a row of parallel metal wires with spacing distinctly shorter than light wave length. It can serve as a polarized-light selecting semitransparent mirror which reflects polarized light whose direction is parallel to the row of wires and transmits polarized light whose direction is perpendicular to the row of wires.

There are two practical methods for manufacturing the above-mentioned polarized-light selecting semitransparent mirror. The first method is to form a thin film with a row of parallel metal whiskers (very fine wires) aligned thereon. This method has been already used for manufacturing polarizing plates for infrared rays. The second method is to etch a pattern of grating with a row of fine wires on a substrate by using photolithographic technology developed for manufacturing ICs and liquid crystal panels. At present, it is possible to etch lines of 20 nm each in width by this method. Accordingly, a pattern of parallel wires equally spaced at spacing distinctly shorter than wavelength of visible light can be obtained. FIG. 27 is an enlarged view of a polarized-light selecting semitransparent mirror manufactured by the photolithographic method. Fine metal wires 51 made of metal, e.g. aluminium, are formed on a light-transmission glass-substrate 50. A space D between metal wires 51 is required to be not more than 100 nm because it must be shorter than the wavelength of the visible light.

Referring now to FIG. 23, reflection and transmission of light in the optical system will be described in detail as follows:

Light from the liquid crystal display 9j is supposed as polarized in the y-axis direction. The linearly polarized light passes first through the polarized-light selecting semitransparent mirror 3j and then the refractor 1j (first pass). When the light further passes through the first quarter-wave plate 5j, it is converted to circularly polarized light which is then divided by the second semi-transparent mirror 2j into two groups of rays: one group Li directly passes therethrough and the other group L'i is reflected thereat. The directly transmitted light Li is converted again by the second quarter-wave plate 5'j to linearly polarized light. Since the first and second quarter-wave plates 5j and 5'j have their crystal axes being in the same direction, the directly transmitted light has been subjected to the same polarization as 1f it had passed through a half-wave plate, and the final direction of this linearly polarized light is rotated by 90° to coincide with the x-axis direction. Namely, the linearly polarized light changes its polarization direction by 900 when it passed two through quarter-wave plates and, therefore, is then absorbed by polarizer plate 4j. Impairment of a display image by the directly transmitted light Li can be thus prevented.

On the other hand, the light L'i reflected by the second semitransparent mirror 2j passes again through the. first quarter-wave plate 5j, being converted to light linearly polarized in the x-axis direction. The linearly polarized light then passes again through (second pass) the refactor 1j and reaches the polarized-light selecting semitransparent mirror 3j by which it is reflected again as linearly polarized in the same x-axis direction (since the direction of its polarization can not be changed by reflection). The light passes through the refactor 1j (third pass) and then passes the first quarter-wave plate 5j, being converted to circularly polarized light whose rays are then divided by the second semitransparent mirror 2j into two groups: one group L'i passes therethrough and the other group is reflected thereat. The passing light L'i is converted by the second quarter-wave plate 5'j to linearly polarized light whose direction meets with y-axis because the light has passed through the quarter plate 5j by two times more than the directly transmitted light Li. Consequently, the light passes through the polarizer plate 4j and falls on eyes E of an observer. The light reflected at the second semi-transparent mirror 2'j (like the previously reflected light) travels to the polarized-light selecting semitransparent mirror 3j and passes therethrough because it is polarized in the y-axis direction, and hence is absorbed by the liquid crystal display 9j. Impairment of a display image by the excessively reflected light can be thus prevented.

As described above, in the shown embodiment of the present invention, light passes three times the refactor 1j which may, therefore, exert three-fold optical power. In practice, a conventional optical system using only optical elements must include three lenses as shown in FIG. 24 to attain the same optical power of the optical system of FIG. 23. As compared with the conventional optical system of FIG. 24, which receives light from a liquid crystal display and leads it through three optical lenses 101f, 101f and 101""f, the optical system of FIG. 23 according to the present invention may realize a considerable saving in length of its optical path and saving in weight by a factor of 3 owing to the effect of reduced number of lenses. This advantage is realized in an optical system with an enlarged visual field angle by using a lens of a larger diameter. Consequently, the optical system according to the present invention is particularly effective for producing a compact and light weight display having a wide angle of view.

Table 6 shows the results of further examination of the transmission efficiency of light rays traveling back and forth between the polarized-light selecting semitransparent mirror 3j and the semitransparent mirror 2j of the optical system, and the intensity of noise light.

TABLE 6

| Number of round trips of light between two semi-transparent mirrors or circularly polarized light selecting semi-transparent mirrors | Kinds of Light | Intensity Ratio to Incident Light (Transmission Efficiency) | Intensity Ratio to Signal Light |
|---|---|---|---|
| 0.5 | Noise (Direct light) | 0 | 0 |
| 1.5 | Signal | 1/4 | 1 |
| 2.5 | Noise | 0 | 0 |
| 3.5 | Noise | 0 | 0 |
| 4.5 | Noise | 0 | 0 |

As is apparent from Table 6, advantages of this embodiment over the preceding embodiment illustrated in FIG. 21 are as follows: the first advantage is that the ratio of signal light to incident light (i.e., transmission efficiency of the signal light) is increased by using a polarized-light selecting semitransparent mirror in place of a semitransparent mirror. The signal ratio of this embodiment is ¼ whereas the signal ratio of the preceding embodiment illustrated in FIG. 21 is ¹⁄₁₆. Namely, the transmission efficiency of this embodiment is 4 times higher than that of the embodiment illustrated in FIG.21. The second advantage is that this embodiment can eliminate all noise light whereas the embodiment illustrated in FIG. 21 allows noise light to remain in the ratio ¹⁄₁₆ to signal light.

Referring FIG. 28(B), another optical system embodying the present invention will be described as follows:

The optical system of FIG. 28(B) comprises a first polarized-light selecting semitransparent mirror 3k, a refactor 1k, a polarization plane rotator means 60k and a second polarized-light selecting semitransparent mirror 3'k, which are arranged in the described order from the incident side (the left side when viewing the illustration). It is assumed that the polarization plane of light transmitted through the first polarized-light selecting semitransparent mirror 3k is confined to the y-axis direction (FIG. 28(A)) and the polarization plane of light transmitted through the second polarized-light selecting semitransparent mirror 3'k is confined to the direction making an angle of 135° with the y-axis direction. The polarization plane rotator means 60k is intended to clockwise rotate the polarization plane of light by 45° about an optical axis when viewing along the direction of light path.

Figure 29:
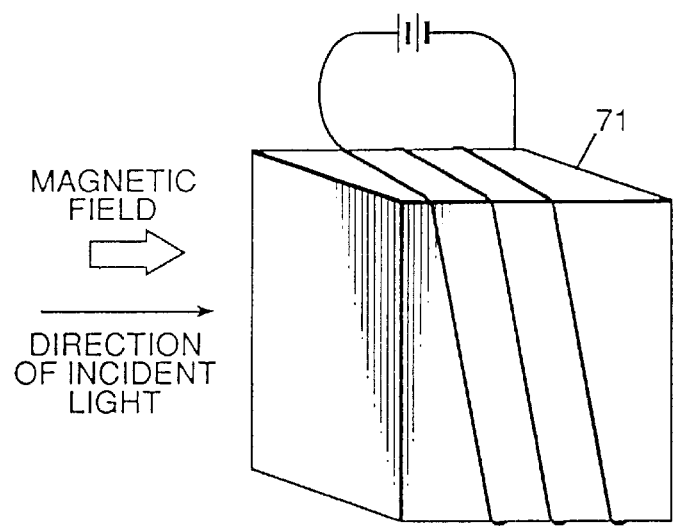
FIG. 29 is illustrative of a Faraday rotation element.

The polarization plane rotation may be realized by using, for example, a Faraday rotation element which is an element made of an isotropic medium such as a homogeneous lead glass 71 placed in a magnetic field as shown in FIG. 29 and which can rotate the plane of polarization of linearly polarized light incident thereon parallel to the magnetic field, the extent being proportional to the intensity of said magnetic field.

In FIG. 28(B), incident light from the left of the illustration passes the first polarized-light selecting semitransparent mirror 3k wherein it is converted to linearly polarized light whose polarization plane is confined to the y-axis direction. The linearly polarized light passes the first refactor 1k (the first pass) and then the polarization plane rotating means 60k whereby its polarization plane is turned to make an angle of 45° with the y-axis. The light is then reflected completely by the second polarized-light selecting semitransparent mirror 3'k because the latter is set to transmit polarized light whose polarization plane makes an angle of 135° with the y-axis.

Therefore, no direct light is transmitted. The reflected light Li passes again through the polarization plane rotator means 60k whereby its polarization plane is turned to an angle of 90°. The light passes through the refactor 1k (the second pass) and returns to the first polarized-light selecting semitransparent mirror 3k whereby it is completely reflected because said mirror 3k is set to transmit the light whose polarization plane is at an angle of 0°. Therefore, no loss of the light is caused thereat. The reflected light passes the refactor 1k (the third pass) and the polarization plane rotator 60k whereby its polarization plane is rotated to 135°. The light is then transmitted through the second polarized-light selecting semitransparent mirror 3'k.

Table 7 shows the results of further examination of the transmission efficiency of light rays traveling back and through between two polarized-light selecting semitransparent mirrors 3k and 3'k of the optical system and the intensity of noise light.

TABLE 7

| Number of round trips of light between two semi-transparent mirrors or circularly polarized light selecting semi-transparent mirrors | Kinds of Light | Intensity Ratio to Incident Light (Transmission Efficiency) | Intensity Ratio to Signal Light |
|---|---|---|---|
| 0.5 | Noise (Direct light) | 0 | 0 |
| 1.5 | Signal | 1 | 1 |
| 2.5 | Noise | 0 | 0 |
| 3.5 | Noise | 0 | 0 |
| 4.5 | Noise | 0 | 0 |

As is apparent from Table 7, advantages of this embodiment over the previously described embodiments illustrated in FIGS. 21 and 23 are as follows: the first advantage is that ratio of signal light to incident light (i.e., transmission efficiency of the signal light) is improved to 1 (100%) while the signal ratio of the embodiments illustrated in FIGS. 21 and 23 is ¹⁄₁₆ and ¼ respectively. The second advantage is that this embodiment can eliminate all noise light like the embodiment illustrated in FIG. 23.

The features of the optical systems in the embodiments are such that the refactor can exert three times the optical power, thereby a thin and light-weight. device having a high optical power can be easily realized by adopting therein an adequate one of the proposed optical systems. Since light from a liquid crystal display is linearly polarized light, it can be effectively used by aligning the incident-side polarizing plate or polarized-light selecting mirror with its transmission direction meeting with the polarization plane of the light from the liquid crystal display.

This embodiment is similar in structure to the embodiments illustrated in FIGS. 21, 23 and 28 and characterized in that a polarized-light semitransparent mirror having a function of a semitransparent mirror or a semitransparent mirror itself is made to have a curved surface. This embodiment is also similar to the embodiments previously described in that a curved surface of a lens (refactor) is coated with a half-mirror coating and light to be transmitted is selected by a polarized-light selecting semitransparent mirror. Accordingly, common elements illustrated in the previously described embodiments are also applicable to this embodiment. The effects of the above-mentioned features of this embodiment are apparent from the description made for the embodiments previously described.

Figure 30:
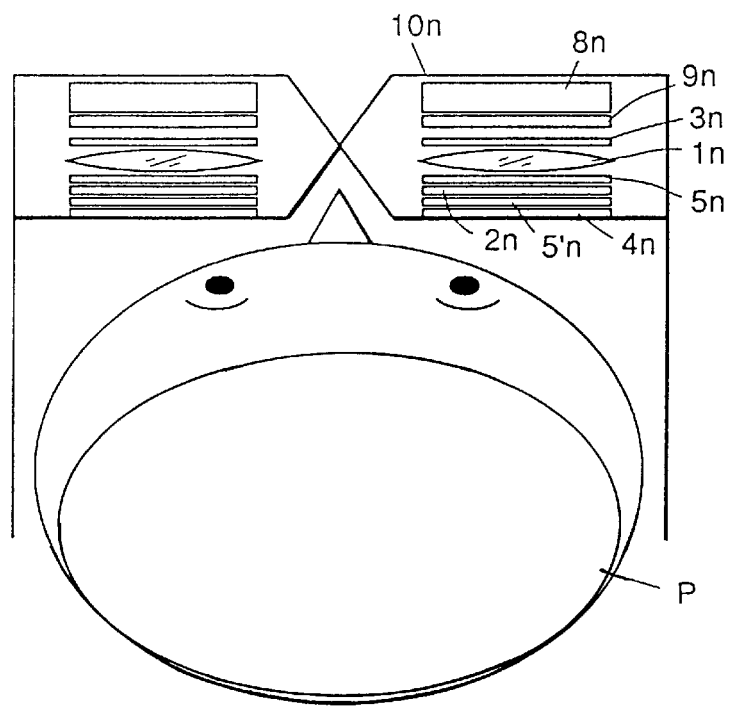
FIG. 30 shows an embodiment of a head-mounted display using an optical device according to the present invention.

Accordingly, a small-sized optical system of this embodiment is particularly suited to use in a head-mounted display. FIG. 30 is illustrative of a head-mounted display wherein the optical device of the present invention is applied.

The head-mounted display is an eyeglass-like case 10a wherein all components are contained. The head-mountable eyeglass-like case 10n contains, in each of two portions corresponding to the two lenses of eyeglasses, a back light 8n, liquid crystal panel 9n, a polarized-light selecting semi-transparent mirror 3n, lens in, a first quarter-wave plate 5n, a semitransparent mirror 2n, a second quarter-wave plate 5'n and a polarizer plate 4n in the described order from the front outside. An image from the liquid crystal display through the above-mentioned optical system reaches an observer's eyes. The head-mounted display must be designed to be comfortable to use by reducing its size (with a minimal protrusion of the lens portion) and weight (with a minimal load to the user's face). Such a comfortable thin-and-light head-mounted display can be realized by using the optical device according to the present invention, which is featured by its wide field-of-view and thickness reduced by a factor of 3 as compared with the conventional optical device.

The following description uses the same definitions on coordinate axes and rotation angle as determined before.

The crystal axis of a quarter-wave plate is defined as follows: A polarized light component being normal to the crystal axis is defined as delayed from a polarized light component, that is parallel to the crystal axis, by one quarter wavelength.

Figure 31A:
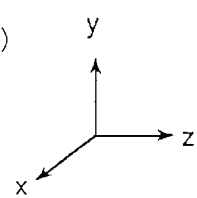
FIGS. 31(A)–31(C) are illustrative of an embodiment of the present invention and descriptive of its coordinates and rotation.
Figure 31B:
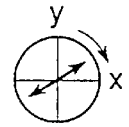

FIG. 31(B) is illustrative of an embodiment of the present invention, which comprises a concave mirror 12p coated with a layer of cholesteric liquid crystal, a first quarter-wave plate 5p, a Faraday element 60p, a second quarter-wave plate 5'p and a thin film of cholesteric liquid crystal 6p, which are disposed in the described order from the left. The following conditions are now supposed: the cholesteric liquid crystal transmits therethrough clockwise circularly polarized light and reflects counterclockwise circularly polarized light. The crystal axis of the first quarter-wave plate 5p is directed to the x-axis (90°) and the crystal axis of the second quarter-wave plate 5'p is directed at an angle of 135°. The Faraday element 60p is intended to rotate by 45° the polarization plane of linearly polarized light.

Figure 31C:
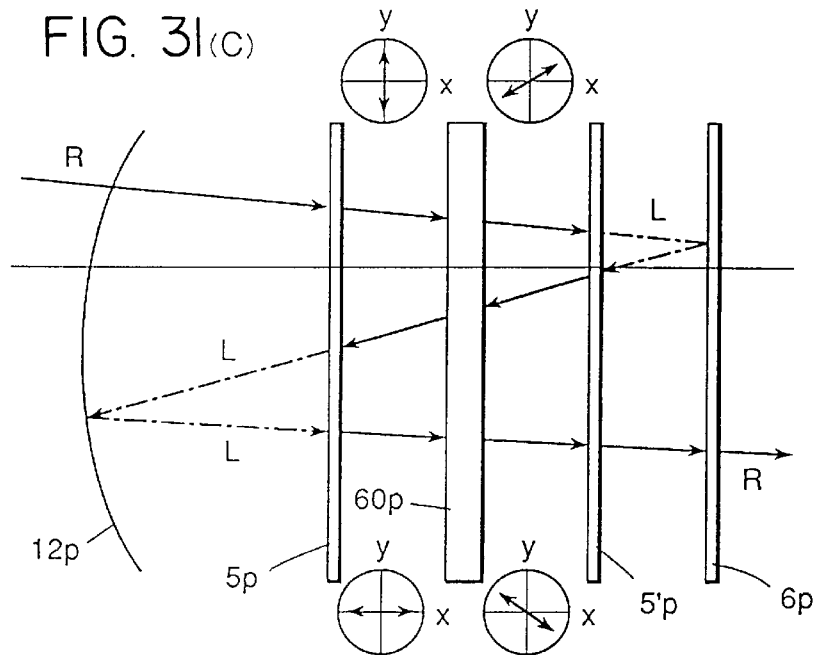

Incident light from the display is clockwise circularly polarized light. These conditions, however, are assumed only for the sake of explanation and do not eliminate the possibility of applying a combination of different parameters that may similarly function in principle. Although FIG. 31(C) illustrates the elements separately from each other for the sake of explanation, they may be assembled in close contact with each other to form a thin integral unit.

Light enters from the left into the optical system shown. This incident light is clockwise circularly polarized and therefore passes a concave mirror 12p coated with a cholesteric liquid crystal and then the first quarter-wave plate 5p. It emerges therefrom as linearly polarized light whose plane of polarization is at an angle of 45°. The linearly polarized light is subjected to rotation of its polarization plane further by 45° and emerges therefrom with its polarization plane making an angle of 90°. The linearly polarized light is then converted to counterclockwise circularly polarized light when passing the second quarter-wave plate 5'p whose crystal axis is directed at 135°. This light is reflected by the cholesteric liquid crystal element 6p and enters as is counterclockwise circularly polarized into the second quarter-wave plate 5'p wherefrom it emerges as linearly polarized light with polarization plane directed at 90° which is further converted by the Faraday element 60p to linearly polarized light whose polarization plane being at 135°. The light passes the first quarter-wave plate 5p, being converted to counterclockwise circularly polarized light.

The counterclockwise circularly polarized light from the first quarter-wave plate 5p is magnified and reflected by the concave mirror 12p coated with cholesteric liquid crystal and then enters as counterclockwise circularly polarized light into the first quarter-wave plate 5p. This light is converted to clockwise polarized light through the optical actions of the first quarter-wave plate 5p, the Faraday element 60p and the second quarter-wave plate 5'p and reaches to the cholesteric liquid crystal element 6p which in this case transmits the clockwise circularly polarized light. The light passes the element 6p and falls onto the user's eyes. The user can see a magnified virtual image of the display.

Figure 32:
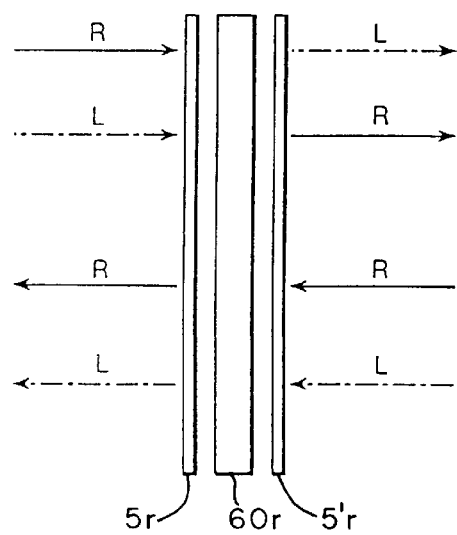
FIG. 32 is a view for explaining the function of an essential portion of FIG. 31.

Referring to FIG. 32, the above-mentioned process is analyzed as follows:

The function of a composite element consisting of a first quarter-wave plate 5r (5p in FIG. 31), a Faraday element 60r (60p) and a second quarter-wave plate 5'r (5'p) may be considered to reverse the rotation direction of circularly polarized light passing therethrough from the left and keep the rotation direction of circular polarized light passing therethrough from the right. The combination of the thus functioning optical unit with the cholesteric liquid crystal element 6p (FIG. 31) can produce the following effects:

In the previously described conventional device, light passes one time the half-mirror-coated concave mirror and is reflected one time thereat, being lost by half at each time. Consequently, total transmission efficiency of the device is 25% even under ideal conditions (without further loss of light). On the contrary, the above-described embodiment of the present invention can attain a complete transmission efficiency of 100% since no loss of light takes place in an ideal cholesteric liquid crystal element 6p. Namely, it can provide an optical image whose brightness is 4 times that of the conventional device. Application of the optical system of this embodiment in a head-mounted display may make it possible to increase the brightness of the display by a factor of 4 as compared with the conventional device and to realize corresponding savings in size and weight of the head-mounted display.

Namely, a head-mounted display must be designed to be comfortable to use by saving in size (with a minimal protrusion of the lens portion) and in weight (with a minimal load to the user's face). Such a comfortable thin-and-light head-mounted display can be realized by using the optical device according to the present invention, which is featured by its wide field-of-view and reduced thickness (¼ in case of FIG. 12(A) as compared with the conventional optical device).

Figure 33:
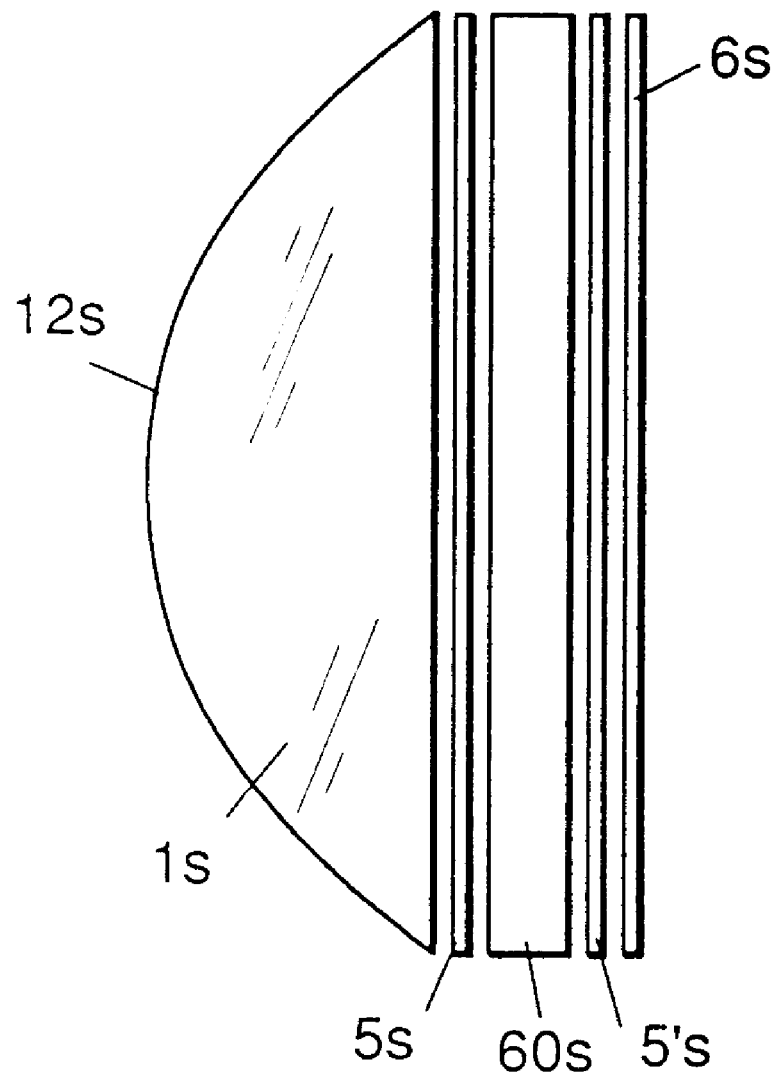
FIG. 33 shows an optical device embodying the present invention.

FIG. 33 is illustrative of an embodiment of the present invention. This embodiment comprises a plano-convex lens is with a coat of cholesteric liquid crystal applied onto its convex surface 12s, a first quarter-wave plate 5s facing to the plane surface of the lens is, a Faraday element 60s, a second quarter-wave plate 5s and a cholesteric liquid crystal element 6s. Namely, this embodiment is a combination of the two preceding embodiments and has advantages of said embodiments. Using the plano-convex lens is reduces the curvature of an image plane, brings its peripheral portion into focus and increases the magnification and visual field angle of the optical system. Using the Faraday element 60s increases the transmission efficiency of the optical system which may provide a bright image. In particular, a head-mounted display using the optical system having these features may produce images with a considerably increased power of presence.

The described embodiment of the present invention realizes an ideal transmission efficiency of near 100% and can provide an image whose brightness is 4 times that of the conventional system.

In the preceding embodiments, a thin film of cholesteric liquid crystal on the convex surface of the plano-convex lens instead is formed by the following method:

A mixed solution of cholesteric liquid crystal monomer and initiator for polymerization by ultraviolet radiation is prepared and applied uniformly to the convex surface of the plano-convex lens. A thin coat of the mixture is then subjected to irradiation by ultraviolet rays. The cholesteric liquid crystal polymerizes to form a solid film on the convex surface of the lens.

The Faraday element 60s is realized by placing a thick film of ferromagnetic material in a magnetic field. The Faraday element 60s thus constructed is used mainly in a so-called "isolator" element that allows a laser beam to pass in one direction but shuts off a laser beam in the reverse direction.

An optical device according to the present invention can selectively reflect and transmit incident circularly polarized light by circularly polarized-light selecting semitransparent mirror and causes the light to make 1.5-round trips between the reflecting-refracting element and the circularly polarized-light selecting semitransparent mirror, thereby attaining an increased optical power (magnification) of its refracting system and a widened visual angle and realizing savings in size (thickness) and weight of the optical device.

An optical device according to the present invention provides an embodiment of the circularly polarized-light selecting semitransparent mirror which is composed of a quarter-wave plate, a half-mirror and a polarizer, thereby easily attaining an increased optical power (magnification) of its refracting system and a widened visual angle and realizing savings in size (thickness) and weight of the optical device, since the above-mentioned components are all manufactured to be sufficiently thin by the existing technology.

An optical device according to the present invention can realize the provision of an optical system having an increased brightness by using a cholesteric liquid crystal as a circularly polarized-light selecting semitransparent mirror.

An optical device according to the present invention is capable of providing the optical system more compact and stable by using a glass substrate in combination with the reflecting-refracting element for sandwiching cholesteric liquid crystal therebetween to form an integral block.

An optical device according to the present invention uses a plano-convex lens having a half-mirror coated convex surface and a cholesteric liquid crystal adjacent to a plane surface of the plano-convex lens in place of the reflecting-refracting element, thereby realizing a more compact optical system.

An optical device according to the present invention can realize a more compact and stable optical system by forming a thin film of cholesteric liquid crystal on a plane of the plano-convex lens.

A head-mounted display according to the present invention is a combination of a liquid crystal display with any one of the optical devices previously described which can satisfy the essential requirements allowing mounting on the head of a user owing to employment of the thin compact light-weight optical device. It has a widened visual angle as compared with the conventional head-mounted display and can provide a high-quality image without curvature, which may attract an observer as if he presents therein.

An optical device illustrated in FIG. 21 is capable of linearly polarizing incident light by a first polarizer plate, selectively transmitting the linearly polarized light by a second polarizer plate according to the direction of polarization plane and causing the light to make 1.5 round trips between two semitransparent mirrors by the action of two quarter-wave plates before being transmited through the second polarizer plate. The optical device thus constructed features an increased optical power (magnifying factor) of the refracting element and a widened visual field, realizing at the same time savings in size (thickness) and weight.

An optical device illustrated in FIG. 23 uses a polarized-light selecting semitransparent mirror in place of the polarizer plate and first semitransparent mirror in the embodiment illustrated in FIG. 21 and, in addition to the effects of the embodiment illustrated in FIG. 21, can attain an improved ratio of signal light to incident light (transmission efficiency) and eliminate a noise light produced by the device illustrated in FIG. 21.

An optical device illustrated in FIG. 28 is capable of converting incident light to specified linearly polarized light by a first polarized-light selecting semitransparent mirror and selectively transmitting 100% of the linearly polarized light by a second polarized-light selecting semitransparent mirror according to the direction of polarization plane, thereby its transmission efficiency is much increased as compared with the devices illustrated in FIGS. 21 and 23 and no noise light is produced.

An optical device, in which a curved surface of a lens (refracting) is coated with a half-mirror coat and light to be transmitted is selected by a polarized-light selecting semitransparent mirror, has the same effects as those of the devices illustrated in FIGS. 6 and 7 excepting that it may realize expected effects with any incident light with no condition of its polarized state like devices illustrated in FIGS. 21, 23 and 28 whereas incident light is defined to be circularly polarized in the embodiments illustrated in FIGS. 6 and 7.

An optical device illustrated in FIG. 31 has a concave mirror with a thin film of a cholesteric liquid crystal formed on the incident surface thereof, said thin film working as a circularly polarized-light selecting semitransparent mirror when incident light is circularly polarized light, and a cholesteric liquid crystal at the exit side for selectively reflecting or transmitting 100% of the light, thereby its optical system attains a high brightness.

An optical device illustrated in FIG. 33 has a plano-convex mirror with a thin film of a cholesteric liquid crystal in place of the concave mirror of the device illustrated in FIG. 31. It may attain an increased optical magnification with a decreased curvature of the image in comparison with the device illustrated in FIG. 31.

A head-mount display according to the present invention, may be a combination of a liquid crystal display and any one of the optical devices illustrated in FIGS. 21, 23, 28 and 31. The head-mount display thus constructed can satisfy the important essential requirements allowing mounting on the head of a user owing to employment of the thin compact light-weight optical device. It has a widened visual angle as compared with the conventional head-mounted display and can provide a high-quality image without curvature, which may attract an observer as if he is drawn therein.

A head-mounted display according to the present invention, which uses a pair of the image display units illustrated in either of the embodiments in FIGS. 10 and 31 and can be most suitably used for presenting an image of virtual reality or an image for remote control.

I claim:

1. An optical device wherein a reflecting and refracting element having a half-mirror coating layer and a semitransparent mirror for selecting circularly polarized light are arranged successively in order from an incident light side the semitransparent mirror for selecting circularly polarized light is composed of a quarter-wave plate, a half-mirror and a polarizer, which are disposed in order from the incident light side.

2. A head-mounted display including an image display device, the image display device comprising:

a liquid crystal display;

a back light for projecting light through said liquid crystal display;

a quarter-wave plate for passing the light projected through said liquid crystal display; and an optical device for magnifying an image of said liquid crystal display responsive to the light passed by said quarter-wave plate, said optical device being a reflecting and refracting element having a half-mirror coating layer and a semi-transparent mirror for selecting circularly polarized light arranged successively in order from an incident light side.

3. A head-mounted display including a pair of image display devices, the pair of image display devices each comprising:

a liquid crystal display;

a back light for projecting light through said liquid crystal display;

a quarter-wave plate for passing the light projected through said liquid crystal display; and an optical device for magnifying an image of said liquid crystal display responsive to the light passed by said quarter-wave plate, said optical device being a reflecting and refracting element having a half-mirror coating layer and a semi-transparent mirror for selecting circularly polarized light arranged successively in order from an incident light side.

* * * * *